US011859101B2

(12) United States Patent
Moravek et al.

(10) Patent No.: US 11,859,101 B2
(45) Date of Patent: *Jan. 2, 2024

(54) CURABLE COMPOSITIONS CONTAINING 1,1-DI-ACTIVATED VINYL COMPOUNDS AND RELATED COATINGS AND PROCESSES

(71) Applicant: PPG Industries Ohio, Inc., Cleveland, OH (US)

(72) Inventors: Scott J. Moravek, Mars, PA (US); Adam B. Powell, Wexford, PA (US); Lawrence G. Anderson, Allison Park, PA (US); Scott W. Sisco, Glenshaw, PA (US); Davina J. Schwartzmiller, Rural Valley, PA (US); Aditya Gottumukkala, Monroeville, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/401,204

(22) Filed: Aug. 12, 2021

(65) Prior Publication Data

US 2021/0371668 A1    Dec. 2, 2021

Related U.S. Application Data

(63) Continuation of application No. 16/320,556, filed as application No. PCT/US2017/044041 on Jul. 26, 2017, now Pat. No. 11,130,867.

(60) Provisional application No. 62/454,943, filed on Feb. 6, 2017, provisional application No. 62/366,781, filed on Jul. 26, 2016.

(51) Int. Cl.
| | |
|---|---|
| C09D 4/06 | (2006.01) |
| C09D 4/00 | (2006.01) |
| C09D 5/00 | (2006.01) |
| C09D 125/14 | (2006.01) |
| C09D 133/14 | (2006.01) |
| C09D 167/00 | (2006.01) |
| C09D 171/02 | (2006.01) |
| C09D 175/04 | (2006.01) |
| C09D 175/06 | (2006.01) |
| C09D 179/02 | (2006.01) |
| C09D 181/02 | (2006.01) |
| B05D 7/00 | (2006.01) |
| C09D 133/06 | (2006.01) |

(52) U.S. Cl.
CPC ............. *C09D 4/06* (2013.01); *B05D 7/50* (2013.01); *B05D 7/52* (2013.01); *B05D 7/53* (2013.01); *B05D 7/532* (2013.01); *C09D 4/00* (2013.01); *C09D 5/00* (2013.01); *C09D 5/002* (2013.01); *C09D 125/14* (2013.01); *C09D 133/066* (2013.01); *C09D 133/14* (2013.01); *C09D 167/00* (2013.01); *C09D 171/02* (2013.01); *C09D 175/04* (2013.01); *C09D 175/06* (2013.01); *C09D 179/02* (2013.01); *C09D 181/02* (2013.01)

(58) Field of Classification Search
None
See application file for complete search history.

(56) References Cited

U.S. PATENT DOCUMENTS

| | | |
|---|---|---|
| 3,197,318 A | 7/1965 | Halpem et al. |
| 3,660,263 A | 5/1972 | Auletta et al. |
| 3,940,362 A | 2/1976 | Overhults |
| 4,382,109 A | 5/1983 | Olson et al. |
| 4,452,861 A | 6/1984 | Okamoto et al. |
| 4,740,534 A | 4/1988 | Matsuda et al. |
| 4,885,191 A | 12/1989 | Podszun et al. |
| 5,321,112 A | 6/1994 | Olson |
| 5,639,828 A | 6/1997 | Briggs et al. |
| 5,723,275 A | 3/1998 | Wang et al. |
| 6,517,940 B1 | 2/2003 | Millero et al. |
| 8,609,885 B2 | 12/2013 | Malofsky et al. |
| 8,884,051 B2 | 11/2014 | Malofsky et al. |
| 9,108,914 B1 | 8/2015 | Malofsky et al. |
| 9,181,365 B2 | 11/2015 | Malofsky et al. |
| 9,221,739 B2 | 12/2015 | Malofsky et al. |
| 9,234,107 B2 | 1/2016 | Malofsky et al. |
| 9,334,430 B1 | 5/2016 | Stevenson et al. |
| 9,416,091 B1 | 8/2016 | Sullivan et al. |
| 9,512,058 B2 | 12/2016 | Malofsky et al. |
| 9,567,475 B1 | 2/2017 | Palsule et al. |

(Continued)

FOREIGN PATENT DOCUMENTS

| | | |
|---|---|---|
| CN | 87105636 A | 3/1988 |
| CN | 102796909 A | 11/2012 |

(Continued)

OTHER PUBLICATIONS

International Search Report and Written Opinion for International Patent Application No. PCT/US2017/044010, dated Oct. 30, 2017.
International Search Report and Written Opinion for International Patent Application No. PCT/US2017/043995, dated Nov. 7, 2017.
International Search Report and Written Opinion for International Patent Application No. PCT/US2017/044041, dated Nov. 7, 2017.
International Search Report and Written Opinion for International Patent Application No. PCT/US2017/044011, dated Oct. 30, 2017.
International Search Report and Written Opinion for International Patent Application No. PCT/US2017/044032, dated Nov. 6, 2017.
International Search Report and Written Opinion for International Patent Application No. PCT/US2017/044014, dated Oct. 27, 2017.

(Continued)

*Primary Examiner* — Sheeba Ahmed
(74) *Attorney, Agent, or Firm* — K&L Gates LLP

(57) ABSTRACT

Curable compositions comprising 1,1-di-activated vinyl compounds are provided herein. Also provided are coatings formed from 1,1-di-activated vinyl compounds. Also provided are processes for coating substrates and articles. Curable compositions including 1,1-di-activated vinyl compounds that function as crosslinking agents are described.

16 Claims, No Drawings

(56) References Cited

U.S. PATENT DOCUMENTS

| | | | |
|---|---|---|---|
| 10,913,875 B2 | 2/2021 | Malofsky et al. | |
| 10,987,697 B2* | 4/2021 | Moravek | C09D 4/00 |
| 11,130,867 B2* | 9/2021 | Moravek | C09D 175/04 |
| 2003/0030170 A1 | 2/2003 | Abe et al. | |
| 2003/0042142 A1 | 3/2003 | Yamoto et al. | |
| 2005/0171273 A1 | 8/2005 | Ledwidge et al. | |
| 2006/0264597 A1 | 11/2006 | Mohanty et al. | |
| 2014/0275419 A1 | 9/2014 | Ward et al. | |
| 2014/0288230 A1 | 9/2014 | Malofsky et al. | |
| 2014/0295099 A1 | 10/2014 | Napper et al. | |
| 2014/0329980 A1 | 11/2014 | Malofsky et al. | |
| 2015/0056879 A1* | 2/2015 | Malofsky | B32B 15/20 |
| | | | 524/508 |
| 2015/0361283 A1 | 12/2015 | Malofsky et al. | |
| 2016/0068618 A1 | 3/2016 | Sullivan et al. | |
| 2018/0094115 A1 | 4/2018 | Martz et al. | |
| 2019/0153244 A1 | 5/2019 | Puodziukynaite et al. | |
| 2019/0160739 A1 | 5/2019 | Olson et al. | |
| 2019/0161620 A1 | 5/2019 | Zalich et al. | |
| 2019/0161637 A1 | 5/2019 | Olson et al. | |
| 2019/0161640 A1 | 5/2019 | Gottumukkala et al. | |

FOREIGN PATENT DOCUMENTS

| | | |
|---|---|---|
| CN | 103520771 A | 1/2014 |
| CN | 104312246 A | 1/2015 |
| CN | 105008438 A | 10/2015 |
| CN | 105536049 A | 5/2016 |
| CN | 105585879 A | 5/2016 |
| EP | 0046088 A1 | 2/1982 |
| EP | 0327129 A1 | 8/1989 |
| EP | 0829756 A2 | 3/1998 |
| EP | 3042939 A1 | 7/2016 |
| JP | 2008019350 A | 1/2008 |
| JP | 2013100599 A | 5/2013 |
| JP | 2014077024 A | 5/2014 |
| JP | 2015518503 A | 7/2015 |
| JP | 2015519416 A | 7/2015 |
| KR | 20130105457 A | 9/2013 |
| KR | 20140145084 A | 12/2014 |
| WO | 2000032709 A1 | 6/2000 |
| WO | 2008086033 A1 | 7/2008 |
| WO | 2013036347 A1 | 3/2013 |
| WO | 2013059473 A2 | 4/2013 |
| WO | 2013149173 A1 | 10/2013 |
| WO | 2015165808 A1 | 11/2015 |
| WO | 2017210415 A1 | 12/2017 |
| WO | 2018022804 A1 | 2/2018 |

OTHER PUBLICATIONS

International Search Report and Written Opinion for International Patent Application No. PCT/US2017/044005, dated Nov. 3, 2017.
Triallyl Isocyanurate TAIC Product Description, Mitsubishi International PolymerTrade Corporation, http://www.michem.com/triallyl_isocyanurate.html, 6 pages, Apr. 4, 2019.
F. Zaragoza Dorwald: "Side Reactions in Organic Synthesis", Mar. 31, 2006, p. 266—book not attached.
Zhu Lifan, "Organic Chemistry", East China University of Science and Technology Press, Aug. 2004, p. 228 Sector 2.

* cited by examiner

CURABLE COMPOSITIONS CONTAINING 1,1-DI-ACTIVATED VINYL COMPOUNDS AND RELATED COATINGS AND PROCESSES

CROSS-REFERENCE TO RELATED APPLICATIONS

This Application is a continuation application of U.S. patent application Ser. No. 16/320,556, filed Jan. 25, 2019, which is a U.S. national stage application of International Patent Application No. PCT/US2017/044041, filed Jul. 26, 2017, which claims priority to U.S. Provisional Patent Application No. 62/366,781, filed on Jul. 26, 2016, and U.S. Provisional Patent Application No. 62/454,943, filed on Feb. 6, 2017, the contents of each are hereby incorporated by reference.

BACKGROUND OF THE INVENTION

Curable compositions can be applied to a wide variety of substrates to provide color and/or other visual effects, corrosion resistance, adhesion, sealability, abrasion resistance, chemical resistance, and the like. For example, multi-layer coatings often include a basecoat layer that provides color and/or other visual effects and a topcoat layer, which sometimes comprises a clearcoat layer, and which provides an abrasion and scratch resistant layer. With respect to multi-layer coatings applied to metal substrates, such as automotive substrates, for example, a primer layer and/or a surface passivation layer may be applied to the bare metal substrate underneath overlying basecoats and topcoats. Generally, each layer of a multi-layer coating is separately dehydrated and/or cured under varying conditions, such as at different flashing and/or baking temperatures, for example, to form the final multi-layer coating. A sealant can be applied as a film over a surface of the substrate to seal or smooth the surface, fill gaps, and/or seal joints and apertures to resist operational conditions, such as moisture and temperature. An adhesive can be applied over a surface to bond together two or more substrate materials.

It would be advantageous to provide coating compositions that form coatings, including multi-layer coatings, characterized by low cure temperatures, novel curing mechanisms, and/or improved coating properties.

SUMMARY OF THE INVENTION

A curable composition comprises a polyol, a polyamine, a polythiol, or a polycarbamate, or a combination of any thereof, and a 1,1-di-activated vinyl compound, or a multifunctional form thereof, or a combination thereof.

A multi-layer curable composition a first curable layer applied over at least a portion of a substrate, and a second curable layer applied over at least a portion of the first curable layer. In the case of a coating composition, the first coating layer and/or the second coating layer comprises one or more of: (1) an addition reaction product of: (1a) a polyol, a polyamine, a polythiol, or a polycarbamate, or a combination of any thereof; and (1b) a 1,1-di-activated vinyl compound, or a multifunctional form thereof, or a combination thereof; and/or (2) a polymerization reaction product of the 1,1-di-activated vinyl compound, or a multifunctional form thereof, or a combination thereof.

A process for coating a substrate comprises applying a first coating layer over at least a portion of a substrate, applying a second coating layer over at least a portion of the first coating layer, and curing the first coating layer and/or the second coating layer. The first coating layer and/or the second coating layer is formed from a curable composition comprising a polyol, a polyamine, polythiol, or a polycarbamate, or a combination of any thereof, and a 1,1-di-activated vinyl compound, or a multifunctional form thereof, or a combination thereof.

It is understood that the invention described in this specification is not necessarily limited to the examples summarized in this Summary.

DETAILED DESCRIPTION OF THE INVENTION

A "curable composition" as used in this specification refers to a composition that has one or more components that can participate in a curing transformation. The composition can undergo a change in its physical properties, over a period of time, as a result of chemical and/or physical processes. A curable composition may be curable at room temperature or a lower temperature, or may require exposure to elevated temperature such as a temperature above room temperature or other condition(s) to initiate and/or to accelerate the curing transformation. Once a curable composition is applied to a surface (and during application), the curing reaction can proceed to provide a cured composition. A cured composition develops a tack-free surface, cures, and then fully cures over a period of time. A composition is considered fully cured when the hardness no longer increases. Curable compositions provided by the present disclosure may be applied directly onto the surface of a substrate as a single layer (often referred to as monocoat) or a multi-layer and/or over an underlayer such as a primer by any suitable process.

The curable compositions provided by the present disclosure may be used, for example, in sealants, coatings, adhesives, encapsulants, and potting compositions. A sealant refers to a composition capable of producing a film that has the ability to resist operational conditions, such as moisture and temperature, and at least partially block the transmission of materials, such as water, fuel, and other liquids and gases. A sealant can be used to seal surfaces, smooth surfaces, fill gaps, seal joints, seal apertures, and other features. A coating refers to a curable composition that is deposited on an article that serves to protect the article and/or improve the appearance of the coated article. Examples include pigmented coatings that provide color to automobiles, airplanes, ships or free-standing structures such as metallic cans, buildings or bridges. An encapsulant refers to a curable composition that is applied on at least a portion of a material to increase durability and/or modulate the workable life of the material. Examples of encapuslants include films of polymeric ethylvinyl actetate used to cover parts of photovoltaic modules to protect the modules from harsh environmental factors. A "putty" or "potting composition" refers to curable composition that is applied to a surface as a filler to smoothen surface irregularities and/or improve appearance. Examples of the application of putty include, but are not limited to, the repair of scratches, holes, deformities, and dents in automobile parts. Other examples of the application of putty include filling cracks in woodwork, securing glass and/or smoothening surfaces in buildings, particularly, walls and ceilings. Adhesives refer to curable compositions utilized to bond together two or more substrate materials. For example, structural adhesives may be used for binding together automotive or industrial components. As used in this disclosure the phrase "curable composition layer" is meant to include sealant, coating, adhesive, encapsulant, and potting composition layers that may be applied over a substrate or over other curable composition layers. For convenience and/or illustration purposes, this disclosure may refer to single or multiple "coating composition layers." However, the use of the phrase "coating composition layer" is used herein for illustrative purposes only, and should be understood to include the various other sealant, adhesive, encapsulant, and potting composition layers that are contemplated as possible alternatives. Accordingly, except as described in the present examples, the phrase "coating composition layer" can be used interchangeably to mean any other curable composition layer contemplated herein, such as a sealant, coating, adhesive, encapsulant, and potting composition layer, as determined by one of ordinary skill in the art.

In addition, when used in the specification, a "first coating layer" or "second coating layer" may include, separately, one or more coating applications to form either the first or second coating layer. Accordingly a "coating layer" as identified herein does not preclude the presence of one or more other coating applications of the same or different composition to form that layer. For example, where the first coating layer is a basecoat layer it is contemplated at one, two, or more basecoat applications may be used together to form the "first coating layer." Similarly, a clearcoat can be contemplated to have one, two or more clearcoat applications to form the "second coating layer".

As used in this specification, particularly in connection with coating layers or films, the terms "on," "onto," "over," and variants thereof (e.g., "applied over," "formed over," "deposited over," "provided over," "located over," and the like), mean applied, formed, deposited, provided, or otherwise located over a surface of a substrate, but not necessarily in contact with the surface of the substrate. For example, a coating layer "applied over" a substrate does not preclude the presence of one or more other coating layers of the same or different composition located between the applied coating layer and the substrate. Likewise, a second coating layer "applied over" a first coating layer does not preclude the presence of one or more other coating layers of the same or different composition located between the applied second coating layer and the applied first coating layer.

As used in this specification, the terms "polymer" and "polymeric" means prepolymers, oligomers, and both homopolymers and copolymers. As used in this specification, "prepolymer" means a polymer precursor capable of further reactions or polymerization by one or more reactive groups to form a higher molecular mass or cross-linked state.

As used in this specification, the prefix "poly" refers to two or more. For example, a "polyfunctional" molecule (whether a polymer, monomer, or other compound) comprises two or more reactive functional groups such as hydroxyl groups, amine groups, mercapto groups, carbamate groups, and the like. More specifically, "polyol" means a compound comprising two or more hydroxyl groups, "polyamine" means a compound comprising two or more amine groups, "polythiol" means a compound comprising two or more mercapto groups, and "polycarbamate" means a compound comprising two or more carbamate groups.

A polyfunctional compound such as a polyol, polyamine, polythiol, or polycarbamate may be a polymer, but does not have to be a polymer, and may comprise, for example, non-polymeric compounds. A polymeric polyol, polymeric polyamine, polymeric polythiol, or polymeric polycarbamate respectively comprises two or more pendant and/or terminal hydroxyl, amine, mercapto, or carbamate functional groups on the polymer molecules. A "pendant group" refers to a group that comprises an offshoot from the side of a polymer backbone and which does not comprise part of the polymer backbone, whereas "terminal group" refers to a group on an end of a polymer backbone and which comprises part of the polymer backbone.

Additionally, the terms polyol, polyamine, polythiol, and polycarbamate may encompass compounds comprising combinations of different types of functional groups. For example, a compound comprising two or more hydroxyl groups and two or more carbamate groups may be referred to as a polyol, a polycarbamate, or a polyol/polycarbamate. Furthermore, polyol, polyamine, polythiol, and polycarbamate compounds may comprise either or both the neutral functional groups (hydroxyl, amine, mercapto, or carbamate) and/or a salt of an ionized form of the functional group (e.g., alkoxide salts, ammonium salts, and the like).

As used in this specification, the term "1,1-di-activated vinyl compound" means a compound comprising a vinyl group having two electron withdrawing groups (EWG) covalently bonded to one of the π-bonded carbons and no substituents covalently bonded to the other π-bonded carbon (i.e., -EWG-C(=CH$_2$)-EWG-), wherein the electron withdrawing groups independently comprise halogen groups, haloalkyl groups, carbonyl-containing groups (e.g., esters, amides, aldehydes, ketones, acyl halides, carboxylic/carboxylate groups), cyano groups, sulfonate groups, ammonium groups, quaternary amine groups, or nitro groups. The term "multifunctional form" means a compound comprising two or more 1,1-di-activated vinyl groups covalently bonded in one molecule. For instance, a dialkyl methylene malonate is an example of a 1,1-di-activated vinyl compound, and a transesterification adduct of a dialkyl methylene malonate and a polyol is an example of a multifunctional form of a dialkyl methylene malonate.

The curable compositions described in this specification comprise a polyol, a polyamine, a polythiol, or a polycarbamate, or a combination of any thereof, and a 1,1-di-activated vinyl compound, or a multifunctional form thereof, or a combination thereof. The 1,1-di-activated vinyl compounds can comprise methylene dicarbonyl compounds, dihalo vinyl compounds, dihaloalkyl disubstituted vinyl compounds, or cyanoacrylate compounds, or multifunctional forms of any thereof, or combinations of any thereof. Examples of 1,1-di-activated vinyl compounds and multifunctional forms thereof that can be used in the coating compositions are described in U.S. Pat. Nos. 8,609,885; 8,884,051; 9,108,914; 9,181,365; and 9,221,739, which are incorporated by reference into this specification. Additional examples of 1,1-di-activated vinyl compounds and multifunctional forms thereof that can be used in the coating compositions are described in U.S. Publication Nos. 2014/0288230; 2014/0329980; and 2016/0068618, which are incorporated by reference into this specification.

The curable compositions can comprise a 1,1-di-activated vinyl compound comprising a methylene malonate. Methylene malonates are compounds having the general formula (I):

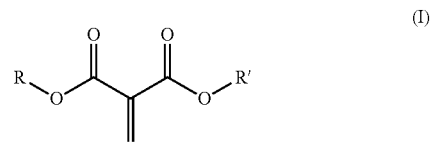

wherein R and R' may be the same or different and may represent nearly any substituent or side-chain, such as substituted or unsubstituted alkyl or aryl groups. For example, the curable compositions can comprise a dialkyl methylene malonate, a diaryl methylene malonate, a multifunctional form of a dialkyl methylene malonate, or a multifunctional form of a diaryl methylene malonate, or a combination of any thereof.

A multifunctional form of a methylene malonate can comprise a transesterification adduct of the methylene malonate and a polyol. A multifunctional form of a methylene malonate can thus have the general formula (II):

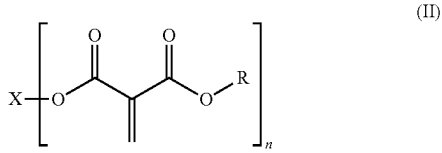

(II)

wherein X is a polyol residue and each R may be the same or different, as described above. As used herein the term "residue" refers to a group derived from the respective compound. For instance, in the above formula, X is an n-valent group derived from a polyol by a transesterification reaction involving methylene malonate and n hydroxyl groups of said polyol. Likewise, a polymer comprising residues of a certain compound is obtained from polymerizing said compound. In some examples, a multifunctional form of a methylene malonate can comprise a transesterification adduct of the methylene malonate and a diol, and thus have the general formula (III):

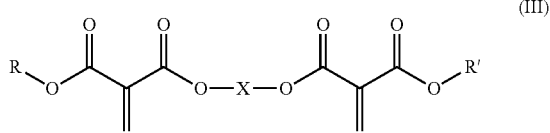

(III)

wherein X is a diol residue and R and R' may be the same or different, as described above.

Polyols that are suitable for the production of a transesterification adduct with a methylene malonate include, for example, polymeric polyols (such as polyether polyols, polyester polyols, acrylic polyols, and polycarbonate polyols) and monomeric polyols (such as alkane polyols, including alkane diols such as 1,5-pentanediol and 1,6-hexanediol). The transesterification adduct can be formed by the reaction of a methylene malonate and a polyol, in the presence of a catalyst, in a suitable reaction medium. Examples of transesterification adducts of methylene malonates and polyols that may be used in the coating compositions are described in U.S. Publication No. 2014/0329980 and U.S. Pat. No. 9,416,091, which are incorporated by reference herein. Further, the concentration of the transesterification adduct can be influenced by ratio of the reactants and/or distillation or evaporation of the reaction medium.

In some examples, the curable compositions can comprise dimethyl methylene malonate (D3M), a multifunctional form of D3M, or both. In some examples, the curable compositions can comprise diethyl methylene malonate (DEMM), a multifunctional form of DEMM, or both. The multifunctional forms of D3M or DEMM can comprise transesterification adducts of D3M or DEMM and a polyol, such as, for example, 1,5-pentanediol or 1,6-hexanediol.

In some examples, the curable compositions can comprise a combination of a dialkyl methylene malonate and a multifunctional form of a dialkyl methylene malonate. The curable compositions can comprise, for example, DEMM and a multifunctional form of DEMM comprising a transesterification adduct of DEMM and at least one polyol. The DEMM can be transesterified with polyol comprising, for example, an alkane diol such as 1,5-pentanediol or 1,6-hexanediol.

As described above, the curable compositions comprise a polyol, a polyamine, a polythiol, or a polycarbamate, or a combination of any thereof, and a 1,1-di-activated vinyl compound, or a multifunctional form thereof, or a combination thereof. While not intending to be bound by any theory, it is believed that the vinyl group(s) in the 1,1-di-activated vinyl compounds and/or the multifunctional forms thereof can react via a Michael addition mechanism with the hydroxyl, amine, mercapto, and/or carbamate groups in polyol, polyamine, polythiol, and/or polycarbamate resins or other compounds (i.e., polyfunctional polymeric resins or polyfunctional monomeric compounds), and thereby form stable covalent linkages. Additionally, the 1,1-di-activated vinyl compounds and/or the multifunctional forms thereof can undergo self-polymerization reactions, thereby forming polymers, which may covalently bond to polyfunctional polymeric resins or polyfunctional monomeric compounds through the linkages formed by the Michael addition reactions with the hydroxyl, amine, mercapto, and/or carbamate groups. Therefore, the 1,1-di-activated vinyl compounds and/or the multifunctional forms thereof can function as crosslinking/curing agents for polyfunctional polymeric resins or polyfunctional monomeric compounds. In some example, the 1,1-di-activated vinyl compounds and/or the multifunctional forms thereof can provide a multiple-cure mechanism comprising both Michael addition reactions and polymerization reactions that crosslink and cure polyfunctional polymeric resins or polyfunctional monomeric compounds.

Polyfunctional polymeric resins that can be formulated in the curable compositions and crosslinked and cured with 1,1-di-activated vinyl compounds and/or the multifunctional forms thereof include polymeric resins comprising pendant and/or terminal hydroxyl, amine, mercapto, and/or carbamate groups, such as, for example, polyether polyols, polyester polyols, acrylic polyols, polycarbonate polyols, polyether polyamines, polyester polyamines, acrylic polyamines, polycarbonate polyamines, polyether polythiols, polyester polythiols, acrylic polythiols, polycarbonate polythiols, polyether polycarbamates, polyester polycarbamates, acrylic polycarbamates, polycarbonate polycarbamates, and combinations of any thereof. Additional polyfunctional polymeric resins that can be formulated in the curable compositions and crosslinked and cured with 1,1-di-activated vinyl compounds and/or the multifunctional forms thereof include any polyfunctional polymeric resins that incorporate hydroxyl, amine, mercapto, or carbamate groups, or combinations of any thereof, including for example, polyester resins, polyurethane resins, polyurea resins, polyether resins, polythioether resins, polycarbonate resins, polycarbamate resins, epoxy resins, phenolic resins, and aminoplast resins (urea-formaldehyde and/or melamine-formaldehyde).

In addition to, or in lieu of, polyfunctional polymeric resins, polyfunctional monomeric compounds can be formulated in the curable compositions and crosslinked and cured with 1,1-di-activated vinyl compounds and/or the multifunctional forms thereof. If polyol compounds are used, they may be the same as or different from those used for forming the transesterification adducts described above. Examples of monomeric polyol compounds include, but are not necessarily limited to, glycols such as ethylene glycol, diethylene glycol, triethylene glycol, 1,2-propylene glycol, 1,3-butylene glycol, tetramethylene glycol, hexamethylene glycol, neopentyl glycol, pentaerythritol, and combinations of any thereof. Other suitable hydroxyl-containing polyfunctional monomeric compounds include, but are not limited to, 1,5-pentandiol, 1,6-hexanediol, cyclohexanedimethanol, 2-ethyl-1,6-hexanediol, 1,4-butanediol, 1,3-propanediol, trimethylol propane, 1,2,6-hexanetriol, glycerol, and combinations of any thereof. Additionally, monomeric amino alcohols that can be formulated in the curable compositions and crosslinked and cured with 1,1-di-activated vinyl compounds and/or the multifunctional forms thereof include, but are not limited to, ethanolamine, propanolamine, butanolamine, and combinations of any thereof.

Examples of monomeric polyamine compounds that can be formulated in the curable compositions and crosslinked and cured with 1,1-di-activated vinyl compounds and/or the multifunctional forms thereof include, for example, diamines such as, for example, ethylenediamine, hexamethylenediamine, 1,2-propanediamine, 2-methyl-1,5-pentamethylenediamine, 2,2,4-trimethyl-1,6-hexanediamine, isophoronediamine, diaminocyclohexane, xylylenediamine, 1,12-diamino-4,9-dioxadodecane, and combinations of any thereof. Other suitable monomeric and polymeric polyamine compounds include polyetheramines such as the Jeffamine® products available from Huntsman Chemical Company.

Examples of monomeric and polymeric polythiol compounds that can be formulated in the curable compositions and crosslinked and cured with 1,1-di-activated vinyl compounds and/or the multifunctional forms thereof include, for example, resins and compounds produced by the esterification of a polyol with a mercapto organic acid. Examples of suitable polyols include the polyols described above, and examples of suitable mercapto organic acids include thioglycolic acid and mercaptopropionic acid. Examples of monomeric polythiol compounds include, but are not limited to, glyceryl dithioglycolate, glyceryl trithioglycolate, glycol dimercaptoacetate, pentaerythritol tetramercaptoacetate, glycol di-(3-mercaptopropionate), pentaerythritol tetra(3-mercaptoproprionate), dipentaerythritol hexa(3-mercaptopropionate), trimethylolpropane tris-(thioglycolate), pentaerythritol tetrakis-(thioglycolate), ethyleneglycol dithioglycolate, trimethylolpropane tris(β-thiopropionate), pentaerythritol tetrakis-(β-thiopropionate), dipentaerythritol poly(β-thiopropionate), and combinations of any thereof. Other suitable monomeric and polymeric polythiol compounds include the Thiocure® products available from Bruno Bock Chemische Fabrik GmbH & Co. KG.

Examples of monomeric and polymeric polycarbamate compounds that can be formulated in the curable compositions and crosslinked and cured with 1,1-di-activated vinyl compounds and/or the multifunctional forms thereof include, for example, resins and compounds produced by the transcarbamylation of a polyol with an alkyl carbamate (i.e., the transesterification of the alkyl carbamate with the polyol).

In addition to (1) the polyol, polyamine, polythiol, or polycarbamate, or combinations of any thereof, and (2) the 1,1-di-activated vinyl compound, or multifunctional form thereof, or combination thereof, the curable compositions can further comprise an acid promoter. In some examples, the acid promoter can comprise a strong acid. As used in this specification, the term "strong acid" means an acid having a $pK_a$ in water at 25° C. of less than −1.3 and, for protic acids, at least one proton ($H^+$) that completely dissociates in aqueous solution. Strong acid promoters that can be formulated in the curable compositions include, for example, inorganic strong acids and organic strong acids. Suitable inorganic strong acids include, for example, mineral acids (e.g., hydrochloric acid, perchloric acid, sulfuric acid, and nitric acid) and heteropoly acids (e.g., phosphotungstic acid, phosphomolybdic acid, silicotungstic acid, and silicomolybdic acid). Suitable organic strong acids include, for example, sulfonic acids (e.g., p-toluenesulfonic acid, methanesulfonic acid, and dodecylbenzenesulfonic acid). Combinations of any strong acids (e.g., a mixture of a sulfonic acid and a heteropoly acid) may also be formulated in the curable compositions.

Without intending to be bound by any theory, it is believed that acids may function as Lewis acids in the curable compositions and complex to the 1,3-dicarbonyl motif, thereby promoting a Michael addition reaction between the functional groups on the polyfunctional components and the vinyl groups on the 1,1-di-activated vinyl compound and/or multifunctional form thereof. Accordingly, a strong acid component in a curable composition may shift the crosslinking and curing reactions away from self-polymerization of the 1,1-di-activated vinyl compound and/or multifunctional form thereof and toward Michael addition reactions forming covalent linkages between the polyfunctional components and the 1,1-di-activated vinyl compound and/or multifunctional form thereof.

In addition to (1) the polyol, polyamine, polythiol, or polycarbamate, or combinations of any thereof, and (2) the 1,1-di-activated vinyl compound, or multifunctional form thereof, or combination thereof, the curable compositions can further comprise an activator. As used in this specification, the term "activator" means a compound or other agent capable of initiating and/or catalyzing (i) polymerization of 1,1-di-activated vinyl compounds or multifunctional forms thereof and/or (ii) addition reactions between 1,1-di-activated vinyl compounds or multifunctional forms thereof and polyfunctional components (e.g., polyol, polyamine, polythiol, and/or polycarbamate resins or compounds). The term "activator" includes (1) active forms of activator compounds and (2) latent precursor forms of activator compounds that are capable of conversion from the latent precursor form into the active form (e.g., by exposure to an effective amount of heat, electromagnetic radiation, pressure, or a chemical co-activator). Additionally, latent precursor forms of activator compounds that are capable of conversion into the active form include activators associated with a volatile or otherwise removable neutralizing agent or inhibitor compound that can evaporate or otherwise be removed from the curable composition when applied as a coating layer, thereby activating the activator.

The activator can comprise a base. As used in this specification, the term "base" means an electronegative compound or functional group capable of initiating the anionic polymerization of a 1,1-di-activated vinyl compound. Suitable activators include organic bases (e.g., amine-containing compounds and carboxylate salts), inorganic bases (e.g., hydroxide salts and carbonate salts), organometallic compounds, and combinations of any thereof. Suitable activators also include polymers comprising pendant and/or terminal amine, carboxylate salt, or other base functionality capable of initiating the anionic polymerization of a 1,1-di-activated vinyl compound.

In some examples, the activator comprises a strong base (pH over 9), a moderate base (pH from 8-9), or a weak base (pH from over 7 to 8), or a combination of any thereof. The activator may comprise, for example, sodium acetate; potassium acetate; acid salts of sodium, potassium, lithium, copper, or cobalt; tetrabutyl ammonium fluoride, chloride, or hydroxide; an amine, including primary, secondary, and tertiary amines; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; 1,4-diazabicyclo[2.2.2]octane (DABCO); 1,1'-iminobis-2-propanol (DIPA); 1,2-cyclohexaneamine; 1,3-cyclohexandimethanamine; 2-methylpentamethylenediamine; 3,3-iminodipropylamine; triacetone diamine (TAD); salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; salts of acid containing polymers; salts of polyacrylic acid co-polymers; and combinations of any thereof.

In some examples, the curable compositions can comprise a tertiary amine activator such as, for example, DABCO; 2-(dimethylamino)ethanol (DMAE/DMEA); 2-piperazin-1-ylethylamine; N,N,N',N'-tetrakis(2-hydroxypropyl)ethylenediamine; 2-[2-(dimethylamino)ethoxy]ethanol; 1-[bis[3-(dimethylamino)propyl]amino]-2-propanol; N,N,N',N'',N''-pentamethyldiethylenetriamine; N,N,N',N'-tetraethyl-1,3-propanediamine; N,N,N',N'-tetramethyl-1,4-butanediamine; N,N,N',N'-tetramethyl-1,6-hexanediamine; 1,4,8,11-tetramethyl-1,4,8,11-tetraazacyclotetradecane; 1,3,5-trimethylhexahydro-1,3,5-triazine; methyl dicocoamine; 1,8-diazabicycloundec-7-ene (DBU); 1,5-diazabicyclo-[4,3,0]-non-5-ene (DBN); 1,1,3,3-tetramethylguanidine; or combinations of any thereof.

The activator can comprise an ionic liquid. As used herein, the term "ionic liquid" means a salt having a melting point temperature of less than 100° C. at 1 atmosphere of pressure. Ionic liquids can be in a liquid state at room temperature (approximately 23° C.) and atmospheric pressure. Ionic liquids comprise a cation ionically associated with an anion. The cations can comprise, for example, heterocyclic nitrogen-containing organic cations such as imidazolium cations, pyrazolium cations, pyrrolidinium cations, pyridinium cations, pyrazinium cations, or pyrimidinium cations, including derivatives thereof; or other cations such as, for example, $C_1$-$C_{32}$ tetraalkylphosphonium cations, $C_1$-$C_{32}$ tetraalkylammonium cations, or $C_1$-$C_{32}$ trialkylsulfonium cations. The anions can comprise, for example, a halide ($F^-$, $Cl^-$, $Br^-$, $I^-$), formate, acetate, nitrate, phosphate, sulfonate, tetrafluoroborate, hexfluorophosphate, triflate (trifluoromethane sulfonate), bis(trifluoromethylsulfonyl)imide, tosylate, an alkyl sulfonate anion (e.g., methyl sulfonate), an alkylsulfate anion, a carboxylate anion, or a phthalate anion.

The ionic liquid activators used in the compositions, coatings, and processes described in this specification can comprise any combination of the above-described cations and anions that initiate and/or catalyze (i) polymerization of 1,1-di-activated vinyl compounds or multifunctional forms thereof and/or (ii) addition reactions between 1,1-di-activated vinyl compounds or multifunctional forms thereof and polyfunctional components (e.g., polyol, polyamine, polythiol, and/or polycarbamate resins or compounds).

The ionic liquid activator can comprise an imidazolium salt of the formula:

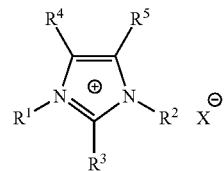

wherein $R^1$ and $R^2$ are each independently a $C_1$-$C_{12}$ alkyl group; $R^3$, $R^4$, and $R^5$ are each independently a hydrogen or a $C_1$-$C_{12}$ alkyl group, and $X^-$ is an anion. In some examples, $R^1$ and $R^2$ are each a $C_1$-$C_{12}$ alkyl group; and $R^3$, $R^4$, and $R^5$ are each a hydrogen atom. In some examples, $R^1$, $R^2$, and $R^3$ are each a $C_1$-$C_{12}$ alkyl group; and $R^4$ and $R^5$ are each a hydrogen atom.

The ionic liquid activator can comprise a pyrazolium salt of the formula:

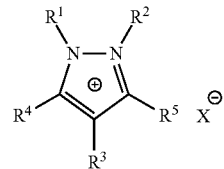

wherein $R^1$ and $R^2$ are each independently a $C_1$-$C_{12}$ alkyl group; $R^3$, $R^4$, and $R^5$ are each independently a hydrogen or a $C_1$-$C_{12}$ alkyl group, and $X^-$ is an anion. In some examples, $R^1$ and $R^2$ are each a $C_1$-$C_{12}$ alkyl group; and $R^3$, $R^4$, and $R^5$ are each a hydrogen atom. In some examples, $R^1$, $R^2$, and $R^3$ are each a $C_1$-$C_{12}$ alkyl group; and $R^4$ and $R^5$ are each a hydrogen atom.

The ionic liquid activator can comprise a pyridinium salt of the formula:

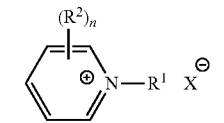

wherein $R^1$ is a $C_1$-$C_{12}$ alkyl group; $R^2$ are each independently a $C_1$-$C_{12}$ alkyl group, n is 0 to 5, and $X^-$ is an anion.

The ionic liquid activator can comprise a pyrimidinium salt and/or a pyrazinium salt of the formulas:

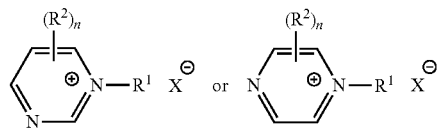

wherein $R^1$ is a $C_1$-$C_{12}$ alkyl group; $R^2$ are each independently a $C_1$-$C_{12}$ alkyl group, n is 0 to 4, and $X^-$ is an anion.

The ionic liquid activator can comprise an ammonium salt and/or a phosphonium salt of the formulas:

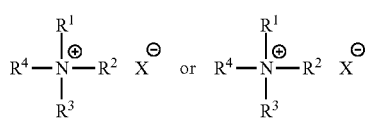

wherein $R^1$, $R^2$, $R^3$, and $R^4$ are each independently a $C_1$-$C_{12}$ alkyl group; and $X^-$ is an anion.

The anion ($X^-$) in the salts described above can comprise, for example, a halide ($F^-$, $Cl^-$, $Br^-$, $I^-$), formate, acetate, nitrate, phosphate, sulfonate, tetrafluoroborate, hexfluorophosphate, triflate (trifluoromethane sulfonate), bis(trifluoromethylsulfonyl)imide, tosylate, an alkyl sulfonate anion (e.g., methyl sulfonate), an alkylsulfate anion, a carboxylate anion, or a phthalate anion.

The ionic liquid activators used in the compositions, coatings, and processes described in this specification can comprise any combination of the above-described cations and anions, and can also comprise combinations of any two or more ionic liquids each independently comprising the above-described cations and anions.

The curable compositions can comprise an activator in amounts, based on total composition weight, ranging from a non-zero amount up to 10%, up to 5%, up to 2%, up to 1%, up to 0.5%, or up to 0.1%, or any sub-range subsumed within such ranges. The activators may be maintained separate from the 1,1-di-activated vinyl compounds or multifunctional forms thereof (e.g., in separate container) until a time sufficiently close to the application of the curable composition over a substrate in order to prevent premature curing of the curable composition. The activator may then be mixed with all of the other components of the curable composition and applied over a substrate using a suitable application technique (e.g., spraying, electrostatic spraying, dipping, rolling, brushing, troweling electrocoating, and the like). In other examples, described below, activators may be applied over and/or under layers of the curable compositions to (1) activate addition reactions between the polyfunctional components and the 1,1-di-activated vinyl compounds or multifunctional forms thereof, and/or (2) activate polymerization reactions among the 1,1-di-activated vinyl compounds or multifunctional forms thereof.

Additional examples of activators and activation methods that can be used in the present curable compositions are described in U.S. Pat. No. 9,181,365, which is incorporated by reference into this specification.

In addition to (1) the polyol, polyamine, polythiol, or polycarbamate, or combinations of any thereof, and (2) the 1,1-di-activated vinyl compound, or multifunctional form thereof, or combination thereof, the curable compositions can further comprise an extender. As used in this specification, the term "extender" means a compound or other agent capable of decreasing the reaction rate of (i) polymerization of 1,1-di-activated vinyl compounds or multifunctional forms thereof and/or (ii) addition reactions between 1,1-di-activated vinyl compounds or multifunctional forms thereof and polyfunctional components (e.g., polyol, polyamine, polythiol, and/or polycarbamate resins or compounds). Accordingly, extenders function to extend the pot life of the curable compositions and can be used in combination with activators and/or acid promoters, as described above, to control the pot life and cure response of the curable compositions comprising (1) the polyol, polyamine, polythiol, or polycarbamate, or combinations of any thereof, and (2) the 1,1-di-activated vinyl compound, or multifunctional form thereof, or combination thereof.

The extenders used in the compositions, coatings, and processes described in this specification can comprise, for example, a carboxylic anhydride compound and/or a carboxylic acid compound. Suitable carboxylic anhydride compounds include, for example, unsaturated anhydrides such as maleic anhydride; citraconic anhydride; itaconic anhydride; aconitic anhydride; bicyclo[2.2.2]oct-7-ene-2,3,5,6-tetracarboxylic dianhydride; crotonic anhydride; 1-cyclopentene-1,2-dicarboxylic anhydride; methacrylic anhydride; or combinations of any thereof. Suitable carboxylic anhydride compounds also include, for example, saturated anhydrides such as the saturated homologues of any of the above-described unsaturated anhydrides (e.g., succinic anhydride). Suitable carboxylic acid compounds include, for example, short-chain (e.g., $C_2$ to $C_{20}$) saturated and unsaturated carboxylic acids such as oxalic acid, acetic acid, propionic acid, octanoic, stearic acid, isostearic acid, benzoic acid, citric acid, (meth)acrylic acid, crotonic acid, isocrotonic acid, vinylacetic acid, 2-pentenoic acid, 3-pentenoic acid, allylacetic acid, maleic acid, fumaric acid, citraconic acid, itaconic acid, aconitic acid, saturated and unsaturated fatty acids (e.g., palmitoleic acid, vaccenic acid, and/or oleic acid), and combinations of any thereof.

Alternatively, or in addition, the extenders used in the compositions, coatings, and processes described in this specification can comprise, for example, an anhydride-containing vinyl polymer and/or a carboxylic acid-containing vinyl polymer. As used in this specification, the term "vinyl polymer" means any polymer produced by addition reactions between carbon-carbon double bonds. Anhydride-containing vinyl polymers can be produced from monomer mixtures comprising an ethylenically unsaturated carboxylic acid anhydride such as, for example, maleic anhydride; citraconic anhydride; itaconic anhydride; aconitic anhydride; bicyclo[2.2.2]oct-7-ene-2,3,5,6-tetracarboxylic dianhydride; crotonic anhydride; 1-cyclopentene-1,2-dicarboxylic anhydride; methacrylic anhydride; or combinations of any thereof. Anhydride-containing vinyl polymers can be produced from monomer mixtures further comprising ethylenically unsaturated monomers such as, for example, styrene and derivatives thereof, vinyl acetate, vinyl chloride, (meth)acrylate esters, and the like. Anhydride-containing vinyl polymers suitable for use as extenders in the compositions, coatings, and processes described in this specification are described, for example, in U.S. Pat. No. 4,798,745 at column 7, line 27 to column 8, line 3, and at column 10, line 40 to column 12, line 59, which is incorporated by reference into this specification.

Carboxylic acid-containing vinyl polymer suitable for use as extenders in the compositions, coatings, and processes described in this specification can be produced from monomer mixtures comprising an ethylenically unsaturated carboxylic acid such as, for example, (meth)acrylic acid, crotonic acid, isocrotonic acid, vinylacetic acid, 2-pentenoic acid, 3-pentenoic acid, allylacetic acid, maleic acid, fumaric acid, citraconic acid, itaconic acid, aconitic acid, saturated and unsaturated fatty acids (e.g., palmitoleic acid, vaccenic acid, and/or oleic acid), and combinations of any thereof. Carboxylic acid-containing vinyl polymers can be produced from monomer mixtures further comprising ethylenically unsaturated monomers such as, for example, styrene and derivatives thereof, vinyl acetate, vinyl chloride, (meth)acrylate esters, and the like. Additionally, vinyl polymers containing both carboxylic acid groups and carboxylic acid anhydride groups can be used as extenders in the compositions, coatings, and processes described in this specification. Such vinyl polymer can be produced from monomer mixtures comprising both an ethylenically unsaturated carboxylic acid and an ethylenically unsaturated carboxylic acid anhydrides, as described above.

In some examples, the curable compositions can comprise (1) the polyol, polyamine, polythiol, or polycarbamate, or combinations of any thereof, (2) the 1,1-di-activated vinyl compound, or multifunctional form thereof, or combination thereof, and (3) any combination of an acid promoter, an activator, and/or an extender, as described above. In addition to (1) the polyol, polyamine, polythiol, or polycarbamate, or combinations of any thereof, (2) the 1,1-di-activated vinyl compound, or multifunctional form thereof, or combination thereof, and (3) any promoter, activator, and/or extender (e.g., an acid and/or base and/or anhydride-containing vinyl polymer), if present, the curable compositions can further comprise additional materials such as additional resins, solvents, reactive diluents, colorants, and the like. As used herein, "colorant" means any substance that imparts color and/or other opacity and/or other visual effect to the coating composition, particularly when applied over a substrate and cured. A colorant can be added to the coating composition in any suitable form, such as discrete particles, dispersions, solutions, and/or flakes. A single colorant or a mixture of two or more colorants can be used in the coatings compositions described in this specification.

Example colorants include pigments (organic or inorganic), dyes, and tints, such as those used in the paint industry and/or listed by the Dry Color Manufacturers Association (DCMA), as well as special effect compositions. A colorant may include, for example, a finely divided solid powder that is insoluble, but wettable under the conditions of use. A colorant can be organic or inorganic and can be agglomerated or non-agglomerated. Colorants can be incorporated into the coating by use of a grind vehicle, such as an acrylic grind vehicle, the use of which will be familiar to persons skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures of any thereof. The terms "pigment" and "colored filler" can be used interchangeably. Example dyes include, but are not limited to, soluble in organic solvents and/or water such as phthalo green or blue, iron oxide, bismuth vanadate, anthraquinone, perylene, and quinacridone.

Example tints include, but are not limited to, pigments dispersed in water-based or water miscible carriers such as AQUA-CHEM 896 (available from Degussa, Inc.), and CHARISMA COLORANTS and MAXITONER INDUSTRIAL COLORANTS (available from the Accurate Dispersions Division of Eastman Chemical Company).

A colorant optionally formulated in the coating compositions can also comprise a special effect composition or pigment. As used herein, a "special effect composition or pigment" means a composition or pigment that interacts with visible light to provide an appearance effect other than, or in addition to, a continuous unchanging color. Example special effect compositions and pigments include those that produce one or more appearance effects such as reflectance, pearlescence, metallic sheen, texture, phosphorescence, fluorescence, photochromism, photosensitivity, thermochromism, goniochromism, and/or color-change. Examples of special effect compositions can include transparent coated mica and/or synthetic mica, coated silica, coated alumina, aluminum flakes, a transparent liquid crystal pigment, a liquid crystal coating, and combinations of any thereof.

Other examples of materials that can be formulated in the curable compositions include plasticizers, abrasion resistant particles, anti-oxidants, hindered amine light stabilizers, UV light absorbers and stabilizers, surfactants, flow and surface control agents, thixotropic agents, solvents and co-solvents, reactive diluents, catalysts, reaction inhibitors, and other customary auxiliaries in the paint and coating industry.

The invention described in this specification includes the use of the curable compositions described above. For example, a process for coating a substrate can comprise applying a first coating layer over at least a portion of a substrate, applying a second coating layer over at least a portion of the first coating layer, and curing the first coating layer and/or the second coating layer. The curing of the first coating layer and the second coating layer can be performed sequentially or simultaneously with or without intermediate flashing, drying, or dehydrating steps. The first coating layer and/or the second coating layer is formed from a curable composition comprising (1) a polyol, a polyamine, a polythiol, or a polycarbamate, or a combination of any thereof, and (2) a 1,1-di-activated vinyl compound, or a multifunctional form thereof, or a combination thereof.

The curable composition, whether applied as the first coating layer and/or the second coating layer, can comprise, in any combination, any of the features or characteristics described above. For example, the 1,1-di-activated vinyl compound can comprise a methylene dicarbonyl compound, a dihalo vinyl compound, a dihaloalkyl disubstituted vinyl compound, or a cyanoacrylate compound, or a multifunctional form of any thereof, or a combination of any thereof. The polyol, polyamine, polythiol, or polycarbamate can comprise a polyfunctional polymeric resin or a polyfunctional monomeric compound or a combination thereof. The curable composition can include a promoter (e.g., a strong acid such as a sulfonic acid and/or a heteropoly acid) and/or an activator (e.g., an amine such as a tertiary amine like DABCO or DMAE/DMEA, or an ionic liquid) and/or an extender (e.g., an anhydride-containing vinyl polymer).

As described above, the curable composition is not necessarily limited to the sole use of an acid promotor or an activator or an extender. In some examples, a combination of both an acid promoter and an activator compound can be used in a curable composition. Similarly, a combination of an acid promoter and an extender, or a combination of an activator compound and an extender, or a combination of all three, can be used in a curable composition. Without intending to be bound by any theory, the presence of an acid promoter, an activator compound, and/or an extender in a curable composition can influence the final coating properties by modulating the cure kinetics and/or the extent of Michael addition reactions versus self-polymerization of the 1,1-di-activated vinyl compound and/or multifunctional form thereof. In some examples, the acid catalyst can comprise a "strong acid" as described above and/or weaker acids. Suitable weaker acids that can be formulated in the curable compositions include, for example, inorganic weak acids and organic weak acids. In this context, weak acids are defined as having pKa in the range of −1.3 to 7 in water at 25° C. Suitable inorganic weak acids include, for example, sulfamic acid, phosphoric acid, hypochlorous acid, and boric acid. Suitable organic weak acids include, for example, carboxylic acids such as oxalic acid, acetic acid, propionic acid, octanoic, stearic acid, isostearic acid, benzoic acid, and citric acid.

As used in this specification, the terms "cure" and "curing" refer to the progression of a liquid curable composition from the liquid state to a cured state and encompass physical drying of curing compositions through solvent or carrier evaporation (e.g., thermoplastic curing compositions) and/or chemical crosslinking of components in the curable compositions (e.g., thermosetting curing compositions). In this regard, the term "cured," as used in this specification, refers to the condition of a liquid curable composition in which a film or layer formed from the liquid curable composition is at least set-to-touch.

In some examples, the curing of the first coating layer and/or the second coating layer can comprise spraying an activator solution over and/or under at least a portion of the first coating layer and/or the second coating layer. The activator solution can comprise an activator (as described above) dissolved or otherwise dispersed in a liquid carrier. The activator solution can comprise an activator compound such as amine activator (e.g., a tertiary amine compound such as DABCO or DMAE/DMEA) dissolved in an aqueous or organic solvent (e.g., an ester solvent such as n-butyl acetate). The activator solution can be sprayed or otherwise applied over a substrate and the curable composition applied over the pre-applied activator solution. Alternatively, or in addition, the activator solution can be sprayed or otherwise applied over a pre-applied layer or film of the curable composition. The activator solution may initiate Michael addition reactions and/or polymerization reactions at the interface of the applied curable composition layer or film and may migrate into the layer or film to further initiate curing reactions.

In some examples, the curing of the first coating layer may be initiated by activator compounds present in the second coating layer, or the curing of the second coating layer may be initiated by activator compounds present in the first coating layer. For instance, the first coating layer may comprise an activator compound, and the curing of the second coating layer comprises activating an addition reaction and/or a polymerization reaction in the second coating layer with the activator compound in the first coating layer. In this manner, the activator compound in the first coating layer may initiate Michael addition reactions and/or polymerization reactions in the second coating layer at the interface between the two layers. The activator compound in the first coating layer may also migrate through the interface and into the second coating layer to further initiate curing reactions. In this example, the chemical composition of the first coating layer may be such that the activator does not function to initiate crosslinking or other curing reactions in the first coating layer, but does so initiate curing reaction in the second coating layer upon application of the second coating layer over and in direct contact with the first coating layer.

Alternatively, the second coating layer may comprise an activator compound, and the curing of the first coating layer comprises activating an addition reaction and/or a polymerization reaction in the first coating layer with the activator compound in the second coating layer. In this manner, the activator compound in the second coating layer may initiate Michael addition reactions and/or polymerization reactions in the first coating layer at the interface between the two layers. The activator compound in the second coating layer may also migrate through the interface and into the first coating layer to further initiate curing reactions. In this example, the chemical composition of the second coating layer may be such that the activator does not function to initiate crosslinking or other curing reactions in the second coating layer, but does so initiate curing reaction in the first coating layer upon application of the second coating layer over and in direct contact with the first coating layer. The activator present in either the first coating layer or the second coating layer which initiates crosslinking or other curing reactions in the other coating layer can comprise an activator compound such as amine activator (e.g., a tertiary amine compound such as DABCO or DMAE/DMEA).

In some examples, the first coating layer and/or the second coating layer can be applied over at least a portion of a bare substrate or a pre-applied coating (e.g., a primer coating) using application techniques such as spraying, electrostatic spraying, dipping, rolling, brushing, electrocoating, and the like. Once applied, the first coating layer and the second coating layer can be dehydrated and/or cured. As described above, the curing of the first coating layer and the second coating layer can be performed sequentially (i.e., the first coating layer is cured before the application of the second coating layer) or simultaneously with or without intermediate flashing, drying, or dehydrating steps. For example, the first coating layer can be applied and dehydrated, the second coating layer can be applied over the dehydrated first coating layer, and both the first and second coating layers baked or otherwise treated to cure the multilayer system. The specific curing conditions of the coating layers will be based, at least in part, on the chemical formulation of the curable composition forming the layers. In some examples, the first coating layer and/or the second coating layer can be dehydrated and/or cured, independently or together, at temperatures ranging from ambient temperature (about 20° C. to 25° C.) to 500° C., or any sub-range subsumed therein, for example, from ambient temperatures to 200° C., from ambient temperatures to 150° C., from ambient temperatures to 140° C., from ambient temperatures to 130° C., from ambient temperatures to 120° C., from ambient temperatures to 100° C. from ambient temperatures to 90° C., from ambient temperatures to 80° C., from ambient temperatures to 60° C., or from ambient temperatures to 50° C.

As described above, 1,1-di-activated vinyl compounds and/or multifunctional forms thereof can function as crosslinking/curing agents for polyfunctional polymeric resins or polyfunctional monomeric compounds. Again not intending to be bound by any theory, it is believed that the vinyl group(s) in the 1,1-di-activated vinyl compounds and/or the multifunctional forms thereof can react via a Michael addition mechanism with the hydroxyl, amine, mercapto, and/or carbamate groups in polyfunctional polymeric resins or polyfunctional monomeric compounds) and thereby form stable covalent linkages. Accordingly, after curing, at least one of the cured first coating layer and/or the cured second coating layer may comprise an addition reaction product of (1) a polyol, a polyamine, a polythiol, or a polycarbamate, or a combination of any thereof, and (2) a 1,1-di-activated vinyl compound and/or a multifunctional forms thereof. The 1,1-di-activated vinyl compound and/or a multifunctional forms thereof may comprise a di alkyl methylene malonate, a diaryl methylene malonate, a multifunctional form of a dialkyl methylene malonate, or a multifunctional form of a diaryl methylene malonate, or a combination of any thereof.

The "Addition Reaction product" refers to the adduct formed by the reaction of 1,1'-di-activated vinyl compound and/or multifunctional form thereof with a nucleophile (such as an amine, thiol or alcohol and/or their polymeric form).

Without being bound to any theory, this may be the result of an addition of the nucleophile to the conjugate double bond ('the Michael Addition Reaction'), or displacing the alcohol of the ester of a 1,1-diactivated vinyl ester with a another alcohol (a trans-esterification reaction), an amine, a thiol and/or a polymeric form of them. For example, the reaction of an amine can result in an amide product and the reaction with a thiol can result in a thioester product. A "polymeric addition product" refers to the product of polymerization reaction, wherein a multitude of reactants react repetitively. Without being bound by any theory, this could be done through a variety of reaction mechanisms, such as anionic polymerization, condensation polymerization, chain growth or radical polymerization. For example, a primary amine can react 1,1'-diethyl methylene malonate (DEMM) via anionic polymerization to form polymeric-DEMM.

In some examples, after curing, at least one of the cured first coating layer and/or the cured second coating layer may comprise an addition reaction product of (1) a polyol, a polyamine, a polythiol, or a polycarbamate, or a combination of any thereof, and (2) diethyl methylene malonate and a multifunctional form of diethyl methylene malonate. The multifunctional form of the diethyl methylene malonate may comprise a transesterification adduct of diethyl methylene malonate and at least one polyol. The transesterification adduct of the diethyl methylene malonate and the at least one polyol may comprise a transesterification adduct of the diethyl methylene malonate and a diol (e.g., an alkane diol such as 1,5-pentanediol or 1,6-hexanediol).

The invention described in this specification includes coatings formed from the curable compositions described above. For example, a multi-layer coating can comprise a first coating layer applied over at least a portion of a substrate, and a second coating layer applied over at least a portion of the first coating layer. The first coating layer and/or the second coating layer can comprise an addition reaction product of: (1a) a polyol, a polyamine, a polythiol, or a polycarbamate, or a combination of any thereof; and (1b) a 1,1-di-activated vinyl compound, or a multifunctional form thereof, or a combination thereof. The first coating layer and/or the second coating layer can additionally or alternatively comprise a polymerization reaction product of the 1,1-di-activated vinyl compound, or a multifunctional form thereof, or a combination thereof.

In examples where only the first coating layer or the second coating layer is formed from a curable composition comprising a polyfunctional resin or compound and a 1,1-di-activated vinyl compound and/or a multifunctional form thereof, the other coating layer can be formed from a different curable composition comprising any useful formulation. Other types of curable compositions than can be used with the coating compositions described in this specification to produce multi-layer coatings include, for example, polyurethane-based coating compositions, polyurea-based coating compositions, acrylic-based coating compositions, epoxy-based coating compositions, polyester-based coating compositions, polyether-based coating compositions, polythioether-based coating compositions, polyamide-based coating compositions, polycarbonate-based coating compositions, polycarbamate-based coating compositions, and aminoplast-based coating compositions (including coating compositions comprising urea-formaldehyde and/or melamine-formaldehyde resins).

The coating compositions described in this specification can be used to form basecoats, topcoats, tiecoats, and the like, in combination with other coating chemistries that form other coating layers in a multi-layer coating system. As used in this specification, the term "basecoat" means a coating layer that is deposited onto a primer and/or directly onto a substrate, optionally including components (such as pigments) that impact the color and/or provide other visual impact. As used in this specification, the term "topcoat" means a coating layer that is deposited over another coating layer such as a basecoat. Topcoats are often, but not always, "clearcoats," which as used in this specification means a coating layer that is at least substantially transparent or fully transparent to visible. As used in this specification, the term "substantially transparent" refers to a coating wherein a surface beyond the coating is at least partially visible to the naked eye when viewed through the coating. As used in this specification, the term "fully transparent" refers to a coating wherein a surface beyond the coating is completely visible to the naked eye when viewed through the coating. It is appreciated that a clearcoat can comprise colorants, such as pigments, provided that the colorants do not interfere with the desired transparency of the clearcoat layer. In some examples, a clearcoat layer is free of added colorants such as pigments. As used in this specification, the term "tiecoat" means a coating layer that is located between two other coating layers, such as, for example, a coating layer located between a basecoat layer and a topcoat layer.

The multi-layer coatings described in this specification can comprise a primer coating layer, which can correspond to a first coating layer. As used in this specification, a "primer coating layer" means an undercoating that may be deposited onto a substrate in order to prepare the surface for application of a protective or decorative coating system. A primer coating layer can be formed over at least a portion of the substrate as a first coating layer and a second coating layer (e.g., a basecoat) can be formed over at least a portion of the primer coating layer. As such, the multi-layer coating of the present invention can comprise a primer coating layer and one or more of a basecoat layer and a topcoat layer.

A first coating layer comprising a primer coating layer can be formed from a curable composition that comprises a film-forming resin such as a cationic based resin, an anionic based resin, and/or any of the additional film-forming resins previously described. The curable composition used to form the primer coating composition can include a corrosion inhibitor, particularly in coating formulations intended for use on metallic substrates. As used in this specification, a "corrosion inhibitor" means a component reduces the rate or severity of corrosion of a surface on a metal or metal alloy substrate. Also, the first coating layer can be a direct gloss coating. A direct gloss coating, in this context, refers to a pigmented top coat layer is either glossy or has a matte finish.

A corrosion inhibitor can include, but is not limited to, an alkali metal component, an alkaline earth metal component, a transition metal component, or combinations of any thereof. The term "alkali metal" refers to an element in Group 1 (International Union of Pure and Applied Chemistry (IUPAC)) of the periodic table of the chemical elements, and includes, e.g., cesium (Cs), francium (Fr), lithium (Li), potassium (K), rubidium (Rb), and sodium (Na). The term "alkaline earth metal" refers to an element of Group 2 (IUPAC) of the periodic table of the chemical elements, and includes, e.g., barium (Ba), beryllium (Be), calcium (Ca), magnesium (Mg), and strontium (Sr). The term "transition metal" refers to an element of Groups 3 through 12 (IUPAC) of the periodic table of the chemical elements, and includes, e.g., titanium (Ti), zirconium (Zr), chromium (Cr), and zinc (Zn), among various others. Examples of inorganic components that can function as corrosion inhibitors in primer coating compositions include magnesium oxide, magnesium hydroxide, magnesium carbonate, magnesium phosphate, magnesium silicate, zinc oxide, zinc hydroxide, zinc carbonate, zinc phosphate, zinc silicate, zinc dust, and combinations thereof.

The components of a primer coating composition can be selected to form an electrodepositable coating composition. As used in this specification, the term "electrodepositable coating composition" refers to a curable composition that is capable of being deposited onto an electrically conductive substrate under the influence of an applied electrical potential. Examples of electrodepositable coating compositions include anionic and cationic electrodepositable coating compositions, such as epoxy or polyurethane-based coatings, such as the electrodepositable coatings described in U.S. Pat. No. 4,933,056 at column 2, line 48 to column 5, line 53; U.S. Pat. No. 5,530,043 at column 1, line 54 to column 4, line 67; U.S. Pat. No. 5,760,107 at column 2, line 11 to column 9, line 60; and U.S. Pat. No. 5,820,987 at column 3, line 48 to column 10, line 63, each of which is incorporated by reference into this specification. Suitable electrodepositable coating compositions also include those commercially available from PPG Industries, Inc., such as the POWERCRON® series of anodic and cathodic epoxy and acrylic coatings, ED-6060C, ED-6280, ED-6465, and ED-7000, for example.

As described above, a primer coating composition can be deposited as a first coating layer directly over at least a portion of a substrate before application of a second coating layer. Alternatively, a first coating layer can be deposited over a cured primer coating layer where the first coating layer functions as a basecoat layer, and a second coating layer deposited over the first coating layer where the second coating layer functions as a topcoat layer or a tiecoat layer (when a subsequent layer is applied over the second coating layer). Once a primer coating composition is applied to at least a portion of a substrate, the primer coating layer can be dehydrated and/or cured before applying an overcoating layer, whether a basecoat or a topcoat. A primer coating composition can be dehydrated and/or cured, for example, at a temperature of 175° C. to 205° C. to form a primer coating layer.

When the curable composition described in this specification is used to form a basecoat layer or a tiecoat layer, the multi-layer coating can comprise a topcoat layer formed from a different coating composition such as, for example a coating composition formulated to produce an isocyanate-crosslinked polyurethane clearcoat. Additional examples of topcoat layers that can be used with the multi-layer coating of the present invention include those described in U.S. Pat. No. 4,650,718 at column 1, line 62 to column 10, line 16; U.S. Pat. No. 5,814,410 at column 2, line 23 to column 9 line 54; and U.S. Pat. No. 5,891,981 at column 2, line 22 to column 12, line 37, each of which is incorporated by reference into this specification. Suitable topcoat coating compositions that can be used to form a topcoat layer over the coating compositions described in this specification also include those commercially available from PPG Industries, Inc. under the trademarks NCT®, DIAMOND COAT®, and CERAMICLEAR®.

As described above, in the multi-layer coatings of the present invention, at least one of the first coating layer and/or the second coating layer can comprise an addition reaction product of: (1a) a polyol, a polyamine, a polythiol, or a polycarbamate, or a combination of any thereof; and (1b) a 1,1-di-activated vinyl compound, or a multifunctional form thereof, or a combination thereof. The first coating layer and/or the second coating layer can additionally or alternatively comprise a polymerization reaction product of the 1,1-di-activated vinyl compound, or a multifunctional form thereof, or a combination thereof. As noted, the 1,1-di-activated vinyl compound can comprise, for example, a methylene dicarbonyl compound, a dihalo vinyl compound, a dihaloalkyl disubstituted vinyl compound, or a cyanoacrylate compound, or a multifunctional form of any thereof, or a combination of any thereof.

In some examples of the multi-layer coating, the first coating layer and/or the second coating layer can comprise an addition reaction product of (1) a polyol, a polyamine, a polythiol, or a polycarbamate, or a combination of any thereof, and (2) a dialkyl methylene malonate, a diaryl methylene malonate, a multifunctional form of a dialkyl methylene malonate, or a multifunctional form of a diaryl methylene malonate, or a combination of any thereof. For instance, the first coating layer and/or the second coating layer can comprise an addition reaction product of (1) a polyol, a polyamine, a polythiol, or a polycarbamate, or a combination of any thereof, and (2) diethyl methylene malonate and a multifunctional form of diethyl methylene malonate. The multifunctional form of diethyl methylene malonate can comprise a transesterification adduct of diethyl methylene malonate and at least one polyol. The transesterification adduct of the diethyl methylene malonate and the at least one polyol can comprise a transesterification adduct of diethyl methylene malonate and a diol (e.g., an alkane diol such as 1,5-pentanediol or 1,6-hexanediol).

In some examples of the multi-layer coating, the first coating layer and/or the second coating layer can be formed from a curable composition including a promoter (e.g., a strong acid such as a sulfonic acid and/or a heteropoly acid) and/or an activator (e.g., an amine such as a tertiary amine like DABCO or DMAE/DMEA, or an ionic liquid) and/or an extender (e.g., an anhydride-containing vinyl polymer). In some examples, the first coating layer comprises an activator compound that activated addition reactions in the second coating layer when the second coating layer was applied over the first coating layer. In other examples, the second coating layer comprises an activator compound that activated addition reactions in the first coating layer when the second coating layer was applied over the first coating layer.

In some examples, the second coating layer comprises (1) an addition reaction product of the polyfunctional resin or polyfunctional compound and the 1,1-di-activated vinyl compound and/or multifunctional form thereof, and/or (2) a polymerization reaction product of the 1,1-di-activated vinyl compound and/or multifunctional form thereof, and the first coating layer is formed from a curable composition that cures when heated at a temperature of less than 500° C., less than 200° C., less than 150° C., less than 140° C., less than 130° C., less than 120° C., or less than 100° C. The curable composition that forms the first coating layer can comprise, for example, polyurethane-based coating compositions, polyurea-based coating compositions, acrylic-based coating compositions, epoxy-based coating compositions, polyester-based coating compositions, polyether-based coating compositions, polythioether-based coating compositions, polyamide-based coating compositions, polycarbonate-based coating compositions, polycarbamate-based coating compositions, and aminoplast-based coating compositions (including coating compositions comprising urea-formaldehyde and/or melamine-formaldehyde resins). In some examples, the first coating layer is formed from a curable composition that does not comprise (i.e., is substantially free of) melamine resin and formaldehyde condensates. The term "substantially free," as used in this specification, means that the described materials are present, if at all, at incidental impurity levels, generally less than 1000 parts per million (ppm) by weight based on total curable composition weight.

In some examples, the first coating layer comprises (1) an addition reaction product of the polyfunctional resin or polyfunctional compound and the 1,1-di-activated vinyl compound and/or multifunctional form thereof, and/or (2) a polymerization reaction product of the 1,1-di-activated vinyl compound and/or multifunctional form thereof, and the second coating layer comprises a clearcoat layer (e.g., an isocyanate-crosslinked polyurethane clearcoat layer).

The curable compositions can be applied to a wide range of substrates including vehicle components and components of free-standing structures such as buildings, bridges, or other civil infrastructures. More specific substrates include, but are not limited to, automotive substrates (e.g., body panels and other parts and components), industrial substrates, aircraft components, watercraft components, packaging substrates (e.g., food and beverage cans), wood flooring and furniture, apparel, electronics (e.g., housings and circuit boards), glass and transparencies, sports equipment (e.g., golf balls, and the like), appliances (e.g., dish washing machines, clothes washing machines, clothes drying machines). Substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylonitrile butadiene styrene (PC/ABS), polyamide, wood, veneer, wood composite, particle board, fiberboard, cement, concrete, brick, stone, paper, cardboard, textiles, leather (both synthetic and natural), glass or fiberglass composites, carbon fiber composites, mixed fiber (e.g., fiberglass and carbon fiber) composites, and the like. The substrate can be one that has been already treated in some manner, such as to impart visual and/or color effect, a protective pretreatment or primer coating layer, or other coating layer, and the like.

The present invention further includes an article comprising the multi-layer coatings formed from the curable compositions described in this specification. For example, the curable compositions of the present invention are also suitable for use as packaging coatings. The application of various pretreatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. Coatings for cans subjected to relatively stringent temperature and/or pressure requirements should also be resistant to popping, corrosion, blushing and/or blistering.

Accordingly, the present invention is further directed to a package coated at least in part with any of the curable compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is a metal can. The term "metal can" includes any type of metal can, container, or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including "E-Z open ends," which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like. The coating can be applied to the interior and/or the exterior of the package.

In some examples, the curable compositions prepared and used according to the present invention may be substantially free, may be essentially free, and/or may be completely free of bisphenol A and epoxy compounds derived from bisphenol A ("BPA"), such as bisphenol A diglycidyl ether ("BADGE"). The term "substantially free" as used in this context means the coatings compositions contain less than 1000 parts per million (ppm), "essentially free" means less than 100 ppm, and "completely free" means less than 20 parts per billion (ppb) of any of the above mentioned compounds, derivatives, or residues thereof.

WORKING EXAMPLES

The following working examples are intended to further describe the invention. It is understood that the invention described in this specification is not necessarily limited to the examples described in this section. In particular, the curable compositions of the disclosure may take various forms, including sealants, coatings, adhesives, encapsulants, and potting compositions, as set forth is some of the following examples presented herein.

Example 1

A Curable Composition Comprising a Polyol and a 1,1-Di-Activated Vinyl Compound

An acrylic polyol was prepared by copolymerizing, in percent by weight, 22.4% isostearic acid, 23.3% hydroxypropyl acrylate, 10.7% methyl methacrylate, 32.4% styrene, and 11.2% glycidyl methacrylate. The acrylic polyol was dissolved in xylene at 58.8% solids by weight. A crosslinker composition was provided comprising a 1,1-di-activated vinyl compound and a multifunctional form thereof (a combination of diethyl methylene malonate and a transesterification adduct of diethyl methylene malonate and 1,6-hexanediol). The acrylic polyol, the crosslinker composition, and an activator solution (comprising 5% 1,4-diazabicyclo[2.2.2]octane in n-butyl acetate) were combined together to form test samples as provided in Table 1.

TABLE 1

| Sample | Acrylic Polyol[1] (g) | Crosslinker Composition[2] (g) | OH:ene Ratio | Activator Solution[3] (g) | Gel Time |
|---|---|---|---|---|---|
| A | 0 | 0.2 | 0.00 | 0.015 | Immediate |
| B | 1.875 | 1 | 0.47 | 0.015 | 7 min. 30 sec. |
| C | 1.875 | 1 | 0.47 | 0.05 | 5 min. |
| D | 1.875 | 1 | 0.47 | 0.1 | 1 min. 20 sec. |
| E | 1.875 | 1 | 0.47 | 0.2 | 10 sec. |
| F | 1.875 | 0.5 | 0.94 | 0.02 | 76 mins. |
| G | 1.875 | 0.5 | 0.94 | 0.03 | 22 mins. |
| H | 1.875 | 0.5 | 0.94 | 0.04 | 17 mins. |
| I | 1.875 | 0.5 | 0.94 | 0.05 | 10 mins. |
| J | 1.875 | 0.5 | 0.94 | 0.1 | 3 mins. |
| K | 1.875 | 0.5 | 0.94 | 0.5 | 1 min. 15 sec. |
| L | 1.875 | 0.25 | 1.89 | 0.05 | >24 hr. |
| M | 1.875 | 0.25 | 1.89 | 0.1 | >24 hr. |
| N | 1.875 | 0.25 | 1.89 | 0.5 | >24 hr. |
| O | 1.875 | 0.25 | 1.89 | 0.8 | >24 hr. |
| P | 1.875 | 0.25 | 1.89 | 1.5 | >24 hr. |

[1]Acrylic polyol as described in U.S. Publication No. 2004/0234698, Example 4 (Table 5, Footnote 5).
[2]A mixture of diethyl methylene malonate and a transesterification adduct of diethyl methylene malonate and 1,6-hexanediol, as described in U.S. Publication No. 2014/0329980.
[3]5 wt % 1,4-diazabicyclo[2.2.2]octane in n-butyl acetate.

The samples were each combined in 20 mL scintillation vials in the order of (1) acrylic polyol, (2) activator solution, and (3) crosslinker composition with mixing before and after the addition of the crosslinker composition. The gel time was recorded as the time elapsed after combining all components until the composition did not demonstrate a visually observable flow when the vial was inverted.

In samples where a gel formed, the gel was visually clear and homogeneous, indicating addition reaction between the hydroxyl groups on the acrylic polyol when present and the vinyl groups on the diethyl methylene malonate and/or the transesterification adduct of diethyl methylene malonate and 1,6-hexanediol. It was observed that gel time decreased as the amount of activator solution increased. It was also observed that gel time increased as the hydroxyl-to-vinyl group ratio (OH:ene ratio) increased (i.e., as the amount of crosslinker composition decreased).

The results of this Example 1 indicate that curable compositions can be formulated based on curable compositions comprising a polyol and a 1,1-di-activated vinyl compound.

Example 2

A Curable Composition Comprising a Polyamine and a 1,1-Di-Activated Vinyl Compound A trifunctional polyether polyamine was provided comprising a primary amine-terminated polyoxypropylene. (Jeffamine® T-403, available from Huntsman Corporation). A crosslinker composition was provided comprising a 1,1-di-activated vinyl compound and a multifunctional form thereof (a combination of diethyl methylene malonate and a transesterification adduct of diethyl methylene malonate and 1,5-pentanediol). The polyether polyamine and the crosslinker composition were combined together to form test samples as provided in Table 2. The samples were each combined in 20 mL scintillation vials and mixed. The gel time was recorded as the time elapsed after combining all components until the composition did not demonstrate a visually observable flow when the vial was inverted.

TABLE 2

| Sample | Polyether Polyamine[1] (g) | Crosslinker Composition[2] (g) | NH:ene ratio | Gel Time |
|---|---|---|---|---|
| A | 0.82 | 2 | 0.5 | <1 min.[3] |
| B | 1.62 | 2 | 1 | Immediate |
| C | 2.43 | 2 | 1.5 | Immediate |
| D | 2.43 | 1 | 3 | <2 min. |

[1]Jeffamine® T-403, available from Huntsman Corporation.
[2]A mixture of diethyl methylene malonate and a transesterification adduct of diethyl methylene malonate and 1,5-pentanediol, as described in U.S. Publication No. 2014/0329980.
[3]Gel as defined above was not obtained but a very viscous liquid was formed quickly, the viscosity was such that very slow flow could be observed upon inversion of the vial.

The gels that formed in Samples B and C, with amine-to-vinyl group ratios (NH:ene ratio) of 1 or 1.5 (slightly amine rich), were visually clear and homogenous, indicating addition reaction between the amine groups on the polyether polyamine and the vinyl groups on the diethyl methylene malonate and/or the transesterification adduct of diethyl methylene malonate and 1,5-pentanediol. The gels that formed in Samples A and D were relatively amine poor and amine rich, respectively, and contained small localized gel domains within an overall softer gel. Without intending to be bound by any theory, the amine groups on the polyether polyamine likely can function both as a reactant in addition reactions with the vinyl groups and as a catalyst for the addition reactions and the homopolymerization of the crosslinker composition (i.e., base-catalyzed polymerization of the vinyl groups in the diethyl methylene malonate and the transesterification adduct). The multiple functions of the amine groups (i.e., polymerization catalyst and crosslinkable functional group) can lead to inhomogenous gels comprising both polymerization and addition reaction products when the stoichiometry is shifted away from unity.

The results of this Example 2 indicate that curable compositions can be formulated based on curable compositions comprising a polyamine and a 1,1-di-activated vinyl compound

Example 3

A Curable Composition Comprising a Polythiol and a 1,1-Di-Activated Vinyl Compound A tetrafunctional polythiol was provided comprising pentaerythritol tetra(3-mercaptoproprionate) (THIOCURE®

PETMP, available from Bruno Bock Chemische Fabrik GmbH & Co KG). Two crosslinker compositions were provided, each comprising a 1,1-di-activated vinyl compound and a multifunctional form thereof: (1) a combination of diethyl methylene malonate and a transesterification adduct of diethyl methylene malonate and 1,6-hexanediol (referred to below as the "HD" crosslinker composition); and (2) a combination of diethyl methylene malonate and a transesterification adduct of diethyl methylene malonate and 1,5-pentanediol (referred to below as the "PD" crosslinker composition). The polythiol, an HD or PD crosslinker composition, and, in some samples, an activator solution (comprising 5% 1,4-diazabicyclo[2.2.2]octane in n-butyl acetate) were combined together to form test samples as provided in Table 3. The samples were each combined in 20 mL scintillation vials in the order of (1) polythiol, (2) activator solution (if used), and (3) crosslinker composition with mixing before (if activator solution was used) and after the addition of the crosslinker composition. The gel time was recorded as the time elapsed after combining all components until the composition did not demonstrate a visually observable flow when the vial was inverted.

TABLE 3

| Sample | Polythiol[1] (g) | Crosslinker Composition[2] (type/mass (g)) | thiol:ene ratio | Activator Solution[3] (g) | Gel Time |
|---|---|---|---|---|---|
| A | 1.0 | PD/0.2 | 1.0 | 0 | 45 min. |
| B | 2.0 | PD/1.0 | 0.5 | 0 | 45 min. |
| C | 1.0 | HD/1.52 | 0.94 | 0 | >24 hrs. |
| D | 1.0 | HD/1.52 | 0.94 | 0.015 | 26 min. |
| E | 1.0 | HD/1.52 | 0.94 | 0.05 | 20 sec. |

[1]Pentaerythritol tetra(3-mercaptoproprionate).
[2]A mixture of diethyl methylene malonate and a transesterification adduct of diethyl methylene malonate and 1,6-hexanediol (HD), or a mixture of diethyl methylene malonate and a transesterification adduct of diethyl methylene malonate and 1,5-pentanediol (PD), as described in U.S. Publication No. 2014/0329980.
[3]5 wt % 1,4-diazabicyclo[2.2.2]octane in n-butyl acetate.

In addition to the in-vial gel time measurements, samples A and B were used to form coatings applied over cold-rolled steel substrates pre-coated with ED-6060C electrocoat (electrocoat available from PPG Industries, Inc., and substrate panels available in pre-coated form from ACT Test Panels LLC). The coatings were applied by drawdown over the electrocoat on the substrate panels using a wooden applicator to obtain a dry film thickness of 2-4 mils (approximately 50-100 microns).

The coatings formed from samples A and B were tested for film drying and curing properties. Tack-free time was measured as the amount of time required for an applied coating film to achieve a level of dryness, such that, upon the application and removal of a cotton ball, no cotton fibers were transferred to the coating surface. The cotton ball was applied in the following manner:
1. With the substrate panel in a horizontal position, hold a cotton ball approximately 3 inches above and drop the cotton ball onto the applied coating film.
2. Hold the substrate panel coating side up for 5±2 seconds with the cotton ball in contact with the coating film.
3. After the 5±2 seconds, flip the substrate panel coating side down.
   a. If the cotton ball drops off leaving no fibers on the film, the coating is tack-free.
   b. If the cotton ball does not drop off or leaves fibers, repeat steps 1-3 at appropriate time intervals (e.g., every 15 minutes) until coating is tack-free.

MEK double rub tests were also performed. The MEK double rub test reports the number of double (back-and-forth) rubs, performed by hand with a methyl ethyl ketone (MEK) soaked rag, required to dissolve the applied coating such that the substrate is visible. This MEK double rub test was performed 1 hour after achieving a tack-free coating. The double rubs were performed up to a maximum number of 100 and discontinued.

A gel formed for all of samples A-E, and the gels were visually clear and homogeneous, indicating addition reaction between the mercapto groups on the polythiol and the vinyl groups on the diethyl methylene malonate and/or the transesterification adduct of the diethyl methylene malonate. Likewise, the coatings formed from samples A and B were also visually clear and homogeneous. Sample A took 65 minutes and Sample B took 75 minutes to become tack-free after application over the pre-electrocoated steel substrates, and both coatings reached the maximum of 100 MEK double rubs as tested one hour after achieving a tack-free state.

Comparing samples A and C, it was observed that with similar mercapto-to-vinyl group ratios (thiol:ene ratio), the use of the crosslinker composition comprising greater transesterification adduct content (i.e., the PD crosslinker composition used in sample A) correlated with more rapid gel time. Comparing samples C, D, and E, it was also observed that gel time decreased as the amount of activator solution increased.

The results of this Example 3 indicate that coating compositions can be formulated based on curable compositions comprising a polythiol and a 1,1-di-activated vinyl compound.

Example 4

A Coating Composition Comprising a Polyol, a 1,1-Di-Activated Vinyl Compound, and a Strong Acid An acrylic polyol having a weight average molecular weight of 8,600 (Determined by gel permeation chromatography using a Waters 2695 separation module equipped with a Waters 2414 differential refractometer (RI detector). Tetrahydrofuran (THF) was used as the eluent at a flow rate of 1 ml min-1, and two PLgel Mixed-C (300×7.5 mm) columns were used for separation) and a hydroxyl equivalent weight of 438 grams/equivalent (determined by titration with excess acetic anhydride, followed by back-titration with a standard potassium hydroxide solution) was prepared by polymerizing the following monomers (pbw=parts by weight): 140 pbw hydroxypropyl acrylate, 70 pbw styrene, 66.5 pbw butyl acrylate, 64.7 pbw butyl methacrylate, 7 pbw glacial acrylic acid, and 1.75 pbw methyl methacryalate. The acrylic polyol was dissolved at 67% solids by weight in a mixture of ShellSol A100 solvent (a predominantly C9 aromatic hydrocarbon solvent available from Shell Chemicals) and propylene glycol monomethyl ether acetate (PM Acetate available from Eastman Chemical Company). A crosslinker composition was provided comprising a 1,1-di-activated vinyl compound and a multifunctional form thereof (a combination of diethyl methylene malonate and a transesterification adduct of diethyl methylene malonate and 1,5-pentanediol). The acrylic polyol, the crosslinker composition, and a strong acid promoter (phosphotungstic acid) were combined together in the amounts provided in Table 4 to form a coating composition.

TABLE 4

| Component | Part by weight (grams) |
| --- | --- |
| Acrylic Polyol[1] | 52.9 |
| Crosslinker Composition[2] | 42.1 |
| Phosphotungstic Acid | 5 |

[1]Acrylic polyol with Mw of 8,600 hydroxyl equivalent weight of 438 g/eq., 67% solids in A100/PM acetate solvent.
[2]A mixture of diethyl methylene malonate and a transesterification adduct of diethyl methylene malonate and 1,5-pentanediol, as described in U.S. Publication No. 2014/0329980.

A multi-layer coating was prepared by applying the coating composition shown in Table 4 over a steel substrate pre-coated with ED-6465 electrocoat (electrocoat available from PPG Industries, Inc., and substrate panels available in pre-coated form from ACT Test Panels LLC). The components of the coating composition were mixed together in a vial at room temperature then applied by drawdown over the electrocoat on the substrate panels using a drawdown bar with a 3 mil gap. The coated panel was allowed to flash for 7 minutes at ambient conditions and baked for 30 mins at 140° C. The resulting coating was solvent resistant as indicated by surviving 100 MEK double rubs. The coating was visually homogeneous and glossy. Without intending to be bound by any theory, it is believed that the inorganic strong acid facilitated an addition reaction between the hydroxyl groups on the acrylic polyol and the vinyl groups on the diethyl methylene malonate and/or the transesterification adduct of diethyl methylene malonate and 1,5-pentanediol.

Example 5

A Coating Composition Comprising a Polycarbamate, a 1,1-Di-Activated Vinyl Compound, and a Strong Acid A polyester polycarbamate having a weight average molecular weight of 2,200 (Determined by gel permeation chromatography using a Waters 2695 separation module equipped with a Waters 2414 differential refractometer (RI detector). Tetrahydrofuran (THF) was used as the eluent at a flow rate of 1 ml min-1, and two PLgel Mixed-C (300×7.5 mm) columns were used for separation) and a carbamate/hydroxyl combined equivalent weight of 413 grams/equivalent was prepared as described in Example 3 of U.S. Pat. No. 6,228,953 B1. The polyester polycarbamate was dissolved at 66% solids by weight in a mixture of Dowanol PM (glycol ether available from The Dow Chemical Company), propylene glycol monomethyl ether acetate (PM Acetate available from Eastman Chemical Company), ShellSol A100 solvent (a predominantly C9 aromatic hydrocarbon solvent available from Shell Chemicals), and xylene in the ratio 12.7:13.3:7.4:0.6, by weight. A crosslinker composition was provided comprising a 1,1-di-activated vinyl compound and a multifunctional form thereof (a combination of diethyl methylene malonate and a transesterification adduct of diethyl methylene malonate and 1,5-pentanediol). The polyester polycarbamate, the crosslinker composition, and a strong acid promoter (dodecylbenzenesulfonic acid) were combined together in the amounts provided in Table 5 to form a coating composition.

TABLE 5

| Component | Part by weight (grams) |
| --- | --- |
| Polyester Polycarbamate[1] | 51.5 |
| Crosslinker Composition[2] | 43.5 |
| Dodecylbenzenesulfonic Acid | 5 |

[1]Polyester with Mw of 2,300, hydroxyl and carbamate functionality combined equivalent weight of 413 g/eq., 66% solids in Dowanol PM/PM acetate/A100/xylene solvent.
[2]A mixture of diethyl methylene malonate and a transesterification adduct of diethyl methylene malonate and 1,5-pentanediol, as described in U.S. Publication No. 2014/0329980.

A multi-layer coating was prepared by applying the coating composition shown in Table 5 over a steel substrate pre-coated with ED-6465 electrocoat (electrocoat available from PPG Industries, Inc., and substrate panels available in pre-coated form from ACT Test Panels LLC). The components of the coating composition were mixed together in a vial at room temperature then applied by drawdown over the electrocoat on the substrate panels using a drawdown bar with a 3 mil gap. The coated panel was allowed to flash for 7 minutes at ambient conditions and baked for 30 mins at 140° C. The resulting coating was solvent resistant as indicated by surviving 100 MEK double rubs. The coating was visually homogeneous and glossy. Without intending to be bound by any theory, it is believed that the organic strong acid facilitated an addition reaction between the carbamate groups and hydroxyl groups on the polyester polycarbamate and the vinyl groups on the diethyl methylene malonate and/or the transesterification adduct of diethyl methylene malonate and 1,5-pentanediol.

Example 6

A Curable Composition Comprising a Polythiol, a 1,1-Di-Activated Vinyl Compound, and a Strong Acid A tetrafunctional polythiol was provided comprising pentaerythritol tetra(3-mercaptoproprionate) (THIOCURE® PETMP, available from Bruno Bock Chemische Fabrik GmbH & Co KG). A crosslinker composition was provided comprising a 1,1-di-activated vinyl compound and a multifunctional form thereof (a combination of diethyl methylene malonate and a transesterification adduct of diethyl methylene malonate and 1,5-pentanediol). The polythiol, the crosslinker composition, and a strong acid promoter (methanesulfonic acid) were combined together in the amounts provided in Table 6 to form a curable composition.

TABLE 6

| Component | Part by weight (grams) |
| --- | --- |
| Polythiol[1] | 57 |
| Crosslinker Composition[2] | 41 |
| Methanesulfonic Acid | 2 |

[1]Pentaerythritol tetra(3-mercaptoproprionate).
[2]A mixture of diethyl methylene malonate and a transesterification adduct of diethyl methylene malonate and 1,5-pentanediol, as described in U.S. Publication No. 2014/0329980.

Under ambient conditions, the methanesulfonic acid was added to a 20 mL glass vial containing the crosslinker composition. The vial was shaken for several minutes. The polythiol was then added, immediately stirred with a wooden applicator stick, then shaken. Within seconds the vial was hot to the touch, the viscosity of the mixture rapidly increased, and a homogenous gel was formed within 5 minutes. The homogeneity of the resulting gel indicated the occurrence of addition reactions between the mercapto groups on the polythiol and the vinyl groups on the diethyl methylene malonate and/or the transesterification adduct of diethyl methylene malonate and 1,5-pentanediol Example 6 was repeated without the addition of the methanesulfonic acid for comparison. The polythiol and the crosslinker composition were combined together in the amounts provided in Table 7.

TABLE 7

| Component | Part by weight (grams) |
|---|---|
| Thiocure PETMP[1] | 58 |
| DEMM Pentanediol Crosslinker[2] | 42 |

[1]Pentaerythritol tetra(3-mercaptoproprionate).
[2]A mixture of diethyl methylene malonate and a transesterification adduct of diethyl methylene malonate and 1,5-pentanediol, as described in U.S. Publication No. 2014/0329980.

Under ambient conditions, the polythiol was added to a 20 mL glass vial containing the crosslinker composition. The vial was shaken for several minutes. There was no observed exotherm from the mixing of the two reactants. The viscosity of the mixture increased steadily over the course of 3 hours resulting in a homogenous gel. Without intending to be bound by any theory, it is believed that the organic strong acid facilitated an addition reaction between the mercapto groups on the polythiol and the vinyl groups on the diethyl methylene malonate and/or the transesterification adduct of diethyl methylene malonate and 1,5-pentanediol. This addition reaction is believed to occur without the strong acid promoter, but at a slower reaction rate.

Example 7

A Coating Composition Comprising a Polyol and a 1,1-Di-Activated Vinyl Compound

An acrylic polyol was prepared by copolymerizing, in percent by weight, 22.4% isostearic acid, 23.3% hydroxypropyl acrylate, 10.7% methyl methacrylate, 32.4% styrene, and 11.2% glycidyl methacrylate. The acrylic polyol was dissolved in xylene at 58.8% solids by weight. A crosslinker composition was provided comprising a 1,1-di-activated vinyl compound and a multifunctional form thereof (a combination of diethyl methylene malonate and a transesterification adduct of diethyl methylene malonate and 1,6-hexanediol). The acrylic polyol and the crosslinker composition were combined together under ambient conditions in the amounts provided in Table 8 to form a coating composition.

TABLE 8

| Component | Part by weight (grams) |
|---|---|
| Acrylic Polyol[1] | 79 |
| DEMM Hexanediol Crosslinker[2] | 21 |

[1]Acrylic polyol as described in U.S. Publication No. 2004/0234698, Example 4 (Table 5, Footnote 5).
[2]A mixture of diethyl methylene malonate and a transesterification adduct of diethyl methylene malonate and 1,6-hexanediol, as described in U.S. Publication No. 2014/0329980.

A multi-layer coating was prepared by applying the coating composition shown in Table 8 over a steel substrate pre-coated with ED-6060C electrocoat (electrocoat available from PPG Industries, Inc., and substrate panels available in pre-coated form from ACT Test Panels LLC). The components of the coating composition were mixed together in a vial at room temperature then applied by drawdown over the electrocoat on the substrate panels using a drawdown bar with a 3 mil gap. Then 8 g of an activator solution of 1,4-diazabicyclo[2.2.2] octane (DABCO) in n-butyl acetate (0.3% solution by weight) was spray applied over the coating film using a SATA Jet 4000 B HVLP with a 1.3 mm nozzle at 10 psi. The resultant cured coating film was tack-free in 25 minutes as measured by the time from the activator solution spray at which a cotton ball leaves no fibers behind when applied onto the surface of the applied coating film as described above in Example 3.

Example 8

Curable Compositions Comprising a 1,1-Di-Activated Vinyl Compound and an Ionic Liquid Activator, Optionally a Polythiol, and Optionally an Extender A crosslinker composition was provided comprising a 1,1-di-activated vinyl compound and a multifunctional form thereof (a combination of diethyl methylene malonate and a transesterification adduct of diethyl methylene malonate and 1,6-hexanediol). An ionic liquid was provided comprising an alkylimidazolinium phthalate. A tetrafunctional polythiol was provided comprising pentaerythritol tetra(3-mercaptoproprionate). An extender was provided comprising a vinyl polymer prepared using an ethylenically unsaturated carboxylic acid anhydride. The crosslinker composition (or unreacted diethyl methylene malonate), the ionic liquid, the polythiol, and the extender were combined together in the amounts provided in Table 9 to form curable compositions.

TABLE 9

| Sample | Crosslinker Composition[1] (g) | DEMM[2] (g) | Ionic Liquid[3] (g) | Polythiol[4] (g) | Extender[5] (g) |
|---|---|---|---|---|---|
| A | — | 2.0 | 0.03 | — | — |
| B | 2.0 | — | 0.04 | — | — |
| C | — | 2.0 | 0.07 | — | 1.00 |
| D | 2.0 | — | 0.09 | — | 0.50 |
| E | 2.0 | — | — | 1.39 | — |
| F | 2.0 | — | 0.02 | 1.39 | — |
| G | 2.0 | — | 0.07 | 1.39 | 1.00 |

[1]A mixture of diethyl methylene malonate and a transesterification adduct of diethyl methylene malonate and 1,6-hexanediol, as described in U.S. Publication No. 2014/0329980.
[2]Unreacted diethyl methylene malonate (monomeric).
[3]An alkylimidazolinium phthalate, available as IL-002 from Sanyo Chemical Industries, Ltd.
[4]Pentaerythritol tetra(3-mercaptoproprionate), available as THIOCURE ® PETMP, available from Bruno Bock Chemische Fabrik GmbH & Co KG.
[5]Example 1 in U.S. Pat. No. 4,798,745, column 10, line 40-column 11, line, 22, incorporated by reference into this specification.

The components of the curable compositions listed in Table 9 were mixed together in vials at room temperature. The curable compositions were evaluated for gel time, and select formulations were evaluated for coating film drying and curing properties (tack-free time) and solvent resistance (MEK double rub test). Gel time was measured as the time elapsed after combining all ingredients until the composition did not demonstrate a visually observable flow when the vial containing the composition was inverted.

Coating films were prepared by applying the curable compositions listed in Table 9 over 10.16 cm by 30.18 cm cold-rolled steel substrate panels pre-coated with ED-6060 electrocoat (electrocoat available from PPG Industries, Inc., and substrate panels available in pre-coated form from ACT Test Panels LLC). The coatings were applied immediately upon mixing by drawdown over the electrocoat on the substrate panels using a drawdown bar with a 2-4 mil gap (50-102 micrometers). Tack-free time was measured as the amount of time required for a coating to achieve a level of dryness such that upon the application and removal of a cotton ball no cotton fibers were transferred to the coating surface. MEK double rubs (MEK DR) are reported as the number of double rubs performed by hand with a methyl ethyl ketone soaked rag required to dissolve the coating such that the substrate is visible, up to a maximum number of 100 MEK DR. The gel time, tack-free time, and MEK DR results are reported in Table 10.

TABLE 10

| Sample | Gel Time | Tack-Free Time (ambient temperature) | Tack-Free Time (after 60° C. bake for 10 minutes) | MEK DR |
|---|---|---|---|---|
| A | 3 min. | 3 min. | — | — |
| B | 6 min. | 7 min. | — | — |
| C | >1 hour | >1 hour | 0 min. | 0 |
| D | 30 min. | — | 0 min. | 100 |
| E | 3 hour | >3 hour | — | — |
| F | <1 min. | — | — | — |
| G | 10 min. | >1 hour | — | — |

The gel time and tack-free time of Samples A and B show that the ionic liquid was effective at polymerizing the DEMM and the crosslinker composition both in the vial and as a coating film applied onto a panel. It is noted that the short gel time and tack-free time of Samples A and B indicate rapid polymerization of the DEMM or DEMM crosslinker. Sample C was similar to Sample A but it further comprised the extender, which provided for a longer gel time and tack-free time at ambient conditions. Upon a brief bake (60° C. for 10 minutes), Sample C formed a tack-free coating, but did not survive any MEK DR, which was unsurprising because the reaction product is believed to be an un-crosslinked linear polymer formed from anionic polymerization of the DEMM monomer. Sample D was similar to Sample B but it further comprised the extender, which provided for a longer gel time and tack-free time at ambient conditions. Upon a brief bake (60° C. for 10 minutes), Sample D formed a tack-free coating that survived 100 MEK DR, indicating it formed a solvent-resistant crosslinked coating.

Sample E, which contained no ionic liquid, exhibited a relatively slow reaction of the crosslinker composition and the polythiol as indicated by the long gel time and tack-free time. Sample F, which was similar to Sample E but contained added ionic liquid, exhibited a substantially faster reaction as indicated by the gel time under one minute. In fact, the reaction of Sample F upon initial mixing was so fast that it was not possible to apply the composition as a coating film on a substrate panel before the composition was too viscous to apply. Sample G was similar to Sample F but further comprised added extender. The addition of the extender resulted in an intermediate gel time of 10 minutes, as compared to over 3 hours for Sample E and less than one minute for Sample F, which provides a more practical pot life for the composition.

These examples demonstrate the utility of ionic liquid for activating the cure of 1,1-di-activated vinyl compounds and multifunctional forms thereof, alone or in combination with polyfunctional materials such as polyols, polyamines, polythiols, and/or polycarbamates. The use of an extender to control the reaction rate was also demonstrated, thereby providing control over pot life and cure response, and facilitating longer gel times that extend the usable application time of the compositions while still maintaining reasonably fast curing kinetics.

ASPECTS OF THE INVENTION

Aspects of the invention include, but are not limited to, the following numbered clauses.

1. A curable composition comprising: a polyol, a polyamine, a polythiol, or a polycarbamate, or a combination of any thereof; and a 1,1-di-activated vinyl compound, or a multifunctional form thereof, or a combination thereof.

2. The curable composition of clause 1, wherein the 1,1-di-activated vinyl compound comprises a methylene dicarbonyl compound, a dihalo vinyl compound, a dihaloalkyl disubstituted vinyl compound, or a cyanoacrylate compound, or a multifunctional form of any thereof, or a combination of any thereof.

3. The curable composition of clause 1 or clause 2, wherein the 1,1-di-activated vinyl compound comprises a dialkyl methylene malonate, a diaryl methylene malonate, a multifunctional form of a dialkyl methylene malonate, or a multifunctional form of a diaryl methylene malonate, or a combination of any thereof.

4. The curable composition of any one of clauses 1-3, wherein the 1,1-di-activated vinyl compound comprises diethyl methylene malonate and a multifunctional form of diethyl methylene malonate comprising a transesterification adduct of diethyl methylene malonate and at least one polyol.

5. The curable composition of clause 4, wherein the transesterification adduct of diethyl methylene malonate and at least one polyol comprises a transesterification adduct of diethyl methylene malonate and a diol.

6. The curable composition of clause 5, wherein the diol comprises an alkane diol.

7. The curable composition of clause 6, wherein the alkane diol comprises 1,5-pentane diol and/or 1,6-hexanediol.

8. The curable composition of any one of clauses 1-7, further comprising a strong acid.

9. The curable composition of clause 8, wherein the strong acid comprises a sulfonic acid and/or a heteropoly acid.

10. The curable composition of any one of clauses 1-9, further comprising an activator compound.

11. The curable composition of clause 10, wherein the activator compound comprises a tertiary amine.

12. The curable composition of clause 10 or 11, wherein the activator compound comprises an ionic liquid.

13. The curable composition of any one of clauses 1-12, further comprising an acid promoter and an activator compound.

14. The curable composition of clause 13, wherein the acid promoter comprises a strong acid and the activator compound comprises a tertiary amine and/or an ionic liquid.

15. The curable composition of clause 14, wherein the strong acid comprises a sulfonic acid and/or a heteropoly acid.

16. The curable composition of any one of clauses 1-15, further comprising an extender.

17. The curable composition of clause 16, wherein the extender comprises an anhydride-containing vinyl polymer.

18. The curable composition of clause 17, wherein the anhydride-containing vinyl polymer comprises maleic anhydride monomer residues.

19. A multi-layer curable composition comprising: a first curable composition layer applied over at least a portion of a substrate; and a second curable composition layer applied over at least a portion of the first coating layer; wherein the first curable composition layer and/or the second curable composition layer comprises one or more of: (1) an addition reaction product of: (1a) a polyol, a polyamine, a polythiol, or a polycarbamate, or a combination of any thereof; and (1b) a 1,1-di-activated vinyl compound, or a multifunctional form thereof, or a combination thereof; and/or (2) a polymerization reaction product of the 1,1-di-activated vinyl compound, or a multifunctional form thereof, or a combination thereof.

20. The multi-layer curable composition of clause 19, wherein the 1,1-di-activated vinyl compound comprises a methylene dicarbonyl compound, a dihalo vinyl compound, a dihaloalkyl disubstituted vinyl compound, or a cyanoacrylate compound, or a multifunctional form of any thereof, or a combination of any thereof.

21. The multi-layer curable composition of clause 19 or clause 20, wherein the first curable composition layer and/or the second curable composition layer comprises an addition reaction product of: (1a) a polyol, a polyamine, a polythiol, or a polycarbamate, or a combination of any thereof, and (1b) a dialkyl methylene malonate, a diaryl methylene malonate, a multifunctional form of a dialkyl methylene malonate, or a multifunctional form of a diaryl methylene malonate, or a combination of any thereof.

22. The multi-layer curable composition of any one of clauses 19-21, wherein the first curable composition layer and/or the second curable composition layer comprises an addition reaction product of: (1a) a polyol, a polyamine, a polythiol, or a polycarbamate, or a combination of any thereof; and (1b) diethyl methylene malonate and a multifunctional form of diethyl methylene malonate, wherein the multifunctional form of diethyl methylene malonate comprises a transesterification adduct of diethyl methylene malonate and at least one polyol.

23. The multi-layer curable composition of clause 22, wherein the transesterification adduct of diethyl methylene malonate and at least one polyol comprises a transesterification adduct of diethyl methylene malonate and a diol.

24. The multi-layer curable composition of any one of clauses 19-23, wherein: (i) the first curable composition layer comprises an activator compound that activated addition reactions in the second curable composition layer when the second curable composition layer was applied over the first curable composition layer; or (ii) the second curable composition layer comprises an activator compound that activated addition reactions in the first curable composition layer when the second curable composition layer was applied over the first curable composition layer.

25. The multi-layer curable composition of clause 24, wherein the activator compound comprises a tertiary amine compound.

26. The multi-layer curable composition of clause 25, wherein the activator compound comprises 2-(dimethylamino)ethanol and/or 1,4-diazabicyclo[2.2.2]octane.

27. The multi-layer coating of clause 24-26, wherein the activator compound comprises an ionic liquid.

28. The multi-layer curable composition of any one of clauses 19-27, wherein the first coating layer and/or the second curable composition layer is formed from a curable composition comprising a strong acid.

29. The multi-layer curable composition of clause 28, wherein the strong acid comprises a sulfonic acid and/or a heteropoly acid.

30. The multi-layer curable composition of any one of clauses 19-29, further comprising an extender comprising an anhydride-containing vinyl polymer.

31. The multi-layer curable composition of any one of clauses 19-30, wherein the first curable composition layer is formed from a curable composition composition that cures when heated at a temperature of less than 500° C.; and wherein the second curable composition layer comprises (1) the addition reaction product and/or (2) the polymerization reaction product.

32. The multi-layer curable composition of any one of clauses 19-31, wherein the curable composition that forms the first coating layer is substantially free of melamine resin and formaldehyde condensates.

33. The multi-layer curable composition of any one of clauses 19-32, wherein the second curable composition layer comprises a clearcoat layer.

34. An article comprising the multi-layer curable composition of any one of clauses 19-33 deposited over a surface of the article.

35. The article of clause 34, wherein the article comprises a vehicle component or a component of a free-standing structure.

36. A process for coating a substrate comprising: applying a first curable composition layer over at least a portion of a substrate; applying a second curable composition layer over at least a portion of the first curable composition layer; and curing the first curable composition layer and/or the second curable composition layer; wherein the first c curable composition layer and/or the second curable composition layer is formed from a curable composition comprising: a polyol, a polyamine, polythiol, or a polycarbamate, or a combination of any thereof; and a 1,1-di-activated vinyl compound, or a multifunctional form thereof, or a combination thereof.

37. The process of clause 36, wherein the 1,1-di-activated vinyl compound comprises a methylene dicarbonyl compound, a dihalo vinyl compound, a dihaloalkyl disubstituted vinyl compound, or a cyanoacrylate compound, or a multifunctional form of any thereof, or a combination of any thereof.

38. The process of clause 36 or clause 37, wherein the curing of the first curable composition layer and/or the second curable composition layer comprises spraying an activator solution over and/or under at least a portion of the first curable composition layer and/or the second curable composition layer.

39. The process of clause 38, wherein the activator solution comprises an amine activator.

40. The process of clause 39, wherein the amine activator comprises 2-(dimethylamino)ethanol and/or 1,4-diazabicyclo[2.2.2]octane.

41. The process of any one of clauses 36-40, wherein: (i) the first curable composition layer comprises an activator compound, and wherein the curing of the second curable composition layer comprises activating an addition reaction in the second curable composition layer with the activator compound in the first curable composition layer; or (ii) the second curable composition layer comprises an activator compound, and wherein the curing of the first curable composition layer comprises activating an addition reaction in the first curable composition layer with the activator compound in the second curable composition layer.

42. The process of clause 41, wherein the activator compound comprises a tertiary amine compound.

43. The process of clause 42, wherein the activator compound comprises 2-(dimethylamino)ethanol and/or 1,4-diazabicyclo[2.2.2]octane.

44. The process of clause 41-43, wherein the activator compound comprises an ionic liquid.

45. The process of any one of clauses 36-44, wherein at least one of the first curable composition layer and/or the second curable composition layer, when cured, comprises an addition reaction product of: (1a) a polyol, a polyamine, a polythiol, or a polycarbamate, or a combination of any thereof; and (1b) a dialkyl methylene malonate, a diaryl methylene malonate, a multifunctional form of a dialkyl methylene malonate, or a multifunctional form of a diaryl methylene malonate, or a combination of any thereof.

46. The process of any one of clauses 36-45, wherein at least one of the first curable composition layer and/or the second curable composition layer, when cured, comprises an addition reaction product of: (1a) a polyol, a polyamine, a polythiol, or a polycarbamate, or a combination of any thereof; and (1b) diethyl methylene malonate and a multifunctional form of diethyl methylene malonate, wherein the multifunctional form of diethyl methylene malonate comprises a transesterification adduct of diethyl methylene malonate and at least one polyol.

47. The process of clause 46, wherein the transesterification adduct of diethyl methylene malonate and at least one polyol comprises a transesterification adduct of diethyl methylene malonate and a diol.

48. The process of any one of clauses 36-47, wherein the curable composition further comprises a strong acid.

49. The process of clause 48, wherein the strong acid comprises a sulfonic acid and/or a heteropoly acid.

50. The process of any one of clauses 36-49, wherein the curable composition further comprises an extender comprising an anhydride-containing vinyl polymer.

51. An article comprising the curable composition of clause 1 deposited over a surface of the article.

52. The article of clause 51, wherein the article comprises a vehicle component or a component of a free-standing structure.

Various features and characteristics are described in this specification to provide an understanding of the composition, structure, production, function, and/or operation of the invention, which includes the disclosed compositions, coatings, and processes. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description, sufficiency of description, and added matter requirements, including the requirements under 35 U.S.C. § 112(a) and Article 123(2) EPC.

Any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with written description, sufficiency of description, and added matter requirements, including the requirements under 35 U.S.C. § 112(a) and Article 123(2) EPC. Also, unless expressly specified or otherwise required by context, all numerical parameters described in this specification (such as those expressing values, ranges, amounts, percentages, and the like) may be read as if prefaced by the word "about," even if the word "about" does not expressly appear before a number.

Additionally, numerical parameters described in this specification should be construed in light of the number of reported significant digits, numerical precision, and by applying ordinary rounding techniques. It is also understood that numerical parameters described in this specification will necessarily possess the inherent variability characteristic of the underlying measurement techniques used to determine the numerical value of the parameter.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a composition, coating, or process that "comprises," "has," "includes," or "contains" one or more features and/or characteristics possesses those one or more features and/or characteristics, but is not limited to possessing only those one or more features and/or characteristics. Likewise, an element of a composition, coating, or process that "comprises," "has," "includes," or "contains" one or more features and/or characteristics possesses those one or more features and/or characteristics, but is not limited to possessing only those one or more features and/or characteristics, and may possess additional features and/or characteristics.

The grammatical articles "a," "an," and "the," as used in this specification, including the claims, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

Any patent, publication, or other document identified in this specification is incorporated by reference into this specification in its entirety unless otherwise indicated, but only to the extent that the incorporated material does not conflict with existing descriptions, definitions, statements, illustrations, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference. The amendment of this specification to add such incorporated subject matter will comply with written description, sufficiency of description, and added matter requirements, including the requirements under 35 U.S.C. § 112(a) and Article 123(2) EPC.

What is claimed is:

1. A crosslinking composition comprising:
   a first methylene dicarbonyl compound; and
   a multifunctional form of a 1,1-di-activated vinyl compound, wherein the first methylene dicarbonyl compound and the 1,1-diactivated vinyl compound are different.

2. The crosslinking composition of claim 1, wherein the 1,1-di-activated vinyl compound comprises a second methylene dicarbonyl compound, a dihalo vinyl compound, a dihaloalkyl disubstituted vinyl compound, a cyanoacrylate compound, or a combination of any thereof.

3. The crosslinking composition of claim 1, wherein the 1,1-di-activated vinyl compound comprises a second methylene dicarbonyl compound, a dihalo vinyl compound, a dihaloalkyl disubstituted vinyl compound, or a combination of any thereof.

4. The crosslinking composition of claim 1, wherein the 1,1-di-activated vinyl compound comprises a second methylene dicarbonyl compound.

5. The crosslinking composition of claim 1, wherein the 1,1-di-activated vinyl compound comprises:
   a dialkyl methylene malonate;
   a diaryl methylene malonate; or
   a combination of any thereof.

6. The crosslinking composition of claim 1, wherein the first methylene dicarbonyl compound comprises:
   a dialkyl methylene malonate;
   a diaryl methylene malonate; or
   a combination of any thereof.

7. The crosslinking composition of claim 1, wherein the first methylene dicarbonyl compound comprises dimethyl methylene malonate, diethyl methylene malonate, or a combination thereof.

8. The crosslinking composition of claim 1, wherein the first methylene dicarbonyl compound, the 1,1-di-activated vinyl compound, or combination thereof comprises a compound having the formula (I):

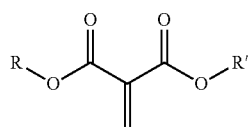

(I)

wherein R and R' are the same or different and are an alkyl group or aryl group.

9. The crosslinking composition of claim 1, wherein the multifunctional form of the 1,1-di-activated vinyl compound comprises a compound having the formula (II):

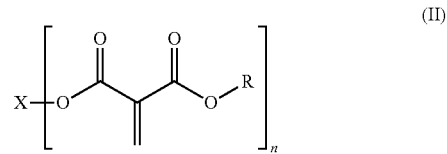

(II)

wherein
X is a polyol residue; and
R is an alkyl group or an aryl group.

10. The crosslinking composition of claim 1, wherein the multifunctional form of the 1,1-di-activated vinyl compound comprises a compound having the formula (III):

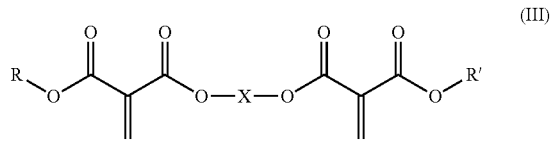

(III)

wherein
X is a diol residue; and
R and R' are the same or different and are an alkyl group or aryl group.

11. The crosslinking composition of claim 1, wherein the crosslinking composition is configured to react with a polyfunctional polymeric resin or a polyfunctional monomeric compound.

12. The crosslinking composition of claim 1, wherein the crosslinking composition is configured to react with a polyfunctional polymeric resin or a polyfunctional monomeric resin via a multiple-cure mechanism comprising both Michael addition reactions and polymerization reactions.

13. A coating layer formed from a curable composition comprising the crosslinking composition of claim 1.

14. An article comprising the coating layer of claim 13 deposited over a surface of the article.

15. The article of claim 14, wherein the article comprises a vehicle component or a component of a free-standing structure.

16. A multi-layer curable composition comprising:
   a first curable composition layer applied over at least a portion of a substrate; and
   a second curable composition layer applied over at least a portion of the first curable composition layer,
   wherein the first curable composition layer, the second curable composition layer, or a combination thereof comprises the crosslinking composition of claim 1.

* * * * *